(12) United States Patent
Soontravanich et al.

(10) Patent No.: US 11,939,553 B2
(45) Date of Patent: *Mar. 26, 2024

(54) NON-CAUSTIC CLEANING COMPOSITIONS AND USES THEREOF

(71) Applicant: Ecolab USA Inc., St. Paul, MN (US)

(72) Inventors: Sukhwan Soontravanich, Inver Grove Heights, MN (US); Paige Mary Owens, Blaine, MN (US); Ashish Dhawan, Aurora, IL (US); Carter Martin Silvernail, Lakeville, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/338,288

(22) Filed: Jun. 3, 2021

(65) Prior Publication Data

US 2021/0380903 A1  Dec. 9, 2021

Related U.S. Application Data

(60) Provisional application No. 63/033,998, filed on Jun. 3, 2020.

(51) Int. Cl.
*C11D 1/72* (2006.01)
*A23C 7/02* (2006.01)
(Continued)

(52) U.S. Cl.
CPC ............. *C11D 1/721* (2013.01); *A23C 7/02* (2013.01); *B01D 65/02* (2013.01); *B01D 71/68* (2013.01);
(Continued)

(58) Field of Classification Search
CPC .. C11D 1/72; C11D 1/721; C11D 3/20; C11D 3/3707; B08B 3/04; B01D 65/02; A23C 7/02

See application file for complete search history.

(56) References Cited

U.S. PATENT DOCUMENTS

| 2,415,009 A | 1/1947 | Hatch et al. |
| 2,797,152 A | 6/1957 | Hughes et al. |

(Continued)

FOREIGN PATENT DOCUMENTS

| DE | 2348576 | * 4/1975 | ............ C07C 43/20 |
| DE | 2348576 A1 | 4/1975 | |

(Continued)

OTHER PUBLICATIONS

Mohamed Heba A. et al., Aromatic Amine-Epoxidized Sunflower Free-Fatty-Acid Adducts as Corrosion Inhibitors in Epoxy-Curable Varnishes, Journal of Applied Polymer Science, vol. 124, (2012), pp. 2007-2015.

(Continued)

*Primary Examiner* — Brian P Mruk
(74) *Attorney, Agent, or Firm* — Stinson LLP

(57) ABSTRACT

Disclosed are detergent compositions and methods of cleaning articles and/or membranes using the surfactants herein. Compounds, compositions, and methods for using these compounds and compositions in detergent or cleaning compositions are also provided. These compounds, compositions, and methods are particularly directed to cleaning compositions and methods that have advantageous cleaning properties at a pH of 7 or less. In particular, the compounds, compositions, and methods described herein can also be used as general surfactants in detergent compositions or in methods of cleaning articles or membranes.

20 Claims, 4 Drawing Sheets

Butterfat Removal

(51) Int. Cl.
*B01D 65/02* (2006.01)
*B01D 71/68* (2006.01)
*B08B 3/04* (2006.01)
*C11D 3/20* (2006.01)
*C11D 3/37* (2006.01)
*C11D 11/00* (2006.01)

(52) U.S. Cl.
CPC ...... *C11D 11/0017* (2013.01); *C11D 11/0029* (2013.01); *C11D 11/0035* (2013.01); *C11D 11/0052* (2013.01); *B01D 2321/168* (2013.01)

(56) References Cited

U.S. PATENT DOCUMENTS

| | | |
|---|---|---|
| 3,000,852 A | 9/1961 | Merz |
| 3,472,666 A | 10/1969 | Foroulis |
| 3,728,281 A | 4/1973 | Marks et al. |
| 4,148,772 A | 4/1979 | Marchetti et al. |
| 4,374,965 A | 2/1983 | Dickie et al. |
| 4,386,939 A | 6/1983 | Lange |
| 4,655,287 A | 4/1987 | Wu |
| 4,664,811 A | 5/1987 | Operhofer |
| 4,728,497 A | 3/1988 | Muccitelli |
| 4,770,790 A | 9/1988 | Oberhofer |
| 4,808,441 A | 2/1989 | Chattha et al. |
| 4,851,421 A | 7/1989 | Iwasaki et al. |
| 5,057,556 A | 10/1991 | Redman |
| 5,318,805 A | 6/1994 | Wu |
| 5,344,674 A | 9/1994 | Wu |
| 5,380,781 A | 1/1995 | Kato et al. |
| 5,447,974 A | 9/1995 | Peng |
| 5,503,836 A | 4/1996 | Fellers et al. |
| 5,756,221 A | 5/1998 | Horibe et al. |
| 5,770,549 A | 6/1998 | Gross |
| 5,853,462 A | 12/1998 | Spellane et al. |
| 5,876,514 A | 3/1999 | Rolando et al. |
| 5,906,864 A | 5/1999 | Osterhold et al. |
| 6,096,225 A | 8/2000 | Yang et al. |
| 6,120,705 A | 9/2000 | Spellane et al. |
| 6,139,830 A | 10/2000 | Donlan et al. |
| 6,207,731 B1 | 3/2001 | Gam |
| 6,653,370 B2 | 11/2003 | Paar et al. |
| 6,670,041 B2 | 12/2003 | Paar et al. |
| 6,835,459 B2 | 12/2004 | Lorenz et al. |
| 6,911,490 B2 | 6/2005 | Feola et al. |
| 7,141,538 B2 | 11/2006 | Noguchi et al. |
| 7,165,561 B2 | 1/2007 | Baldridge et al. |
| 7,414,162 B2 | 8/2008 | Link et al. |
| 7,470,755 B2 | 12/2008 | Abrami et al. |
| 8,445,585 B2 | 5/2013 | Paar et al. |
| 8,501,997 B2 | 8/2013 | Vedage et al. |
| 8,512,594 B2 | 8/2013 | Walker et al. |
| 8,809,392 B2 | 8/2014 | Li et al. |
| 8,901,063 B2 | 12/2014 | Soontravanich et al. |
| 8,927,479 B2 | 1/2015 | Perlas |
| 9,522,974 B2 | 12/2016 | Barriau et al. |
| 9,663,431 B2 | 5/2017 | Griese et al. |
| 9,670,433 B1 | 6/2017 | Hodge et al. |
| 9,719,057 B2 | 8/2017 | Nielsen et al. |
| 9,809,719 B2 | 11/2017 | Paar et al. |
| 9,850,388 B2 | 12/2017 | Paar et al. |
| 9,889,466 B2 | 2/2018 | Grabbe et al. |
| 10,266,794 B2 | 4/2019 | Hunt, Jr. et al. |
| 10,273,433 B2 | 4/2019 | Man et al. |
| 10,308,886 B2 | 6/2019 | Rana et al. |
| 10,351,801 B2 | 7/2019 | Martinez-Crowley et al. |
| 10,479,959 B2 | 11/2019 | Creamer et al. |
| 11,414,626 B2 * | 8/2022 | Dhawan ................. B01D 65/02 |
| 2003/0096725 A1 | 5/2003 | Tsibouklis et al. |
| 2003/0173302 A1 | 9/2003 | Xiong et al. |
| 2008/0108539 A1 | 5/2008 | Kany et al. |
| 2009/0166291 A1 | 7/2009 | Jackson |
| 2009/0270566 A1 | 10/2009 | Thorman et al. |
| 2011/0071069 A1 | 3/2011 | Konishi et al. |
| 2012/0232169 A1 | 9/2012 | Wu et al. |
| 2013/0126113 A1 | 5/2013 | Tan et al. |
| 2015/0080282 A1 | 3/2015 | Krishna et al. |
| 2018/0163020 A1 * | 6/2018 | Zong ......................... C02F 5/12 |
| 2018/0223112 A1 | 8/2018 | Jaquess |
| 2018/0355284 A1 | 12/2018 | Bhole et al. |
| 2019/0144314 A1 | 5/2019 | Lin et al. |
| 2019/0177661 A1 | 6/2019 | Walters et al. |
| 2019/0264139 A1 | 8/2019 | Lant et al. |
| 2020/0172831 A1 | 6/2020 | Dhawan et al. |

FOREIGN PATENT DOCUMENTS

| | | | |
|---|---|---|---|
| EP | 1777288 B1 | 7/2009 | |
| EP | 3415571 A1 | 12/2018 | |
| WO | 2006/025928 A3 | 3/2006 | |
| WO | 2007/008199 A1 | 1/2007 | |
| WO | 2008/036559 A2 | 3/2008 | |
| WO | 2019/067173 A1 | 4/2019 | |
| WO | 2020/113218 A2 | 6/2020 | |
| WO | WO 2020/113218 | * 6/2020 | ............. C08G 65/26 |

OTHER PUBLICATIONS

Ekblad, Tobias et al., Poly(ethylene glycol)-Containing Hydrogel Surfaces for Antifouling Applications in Marine and Freshwater Environments, Biomacromolecules 2008, 9, pp. 2775-2783.

Falk, Nancy A., Surfactants as Antimicrobials: A Brief Overview of Microbial Interfacial Chemistry and Surfactant Antimicrobial Activity, J. Surfact Deterg (2019) 22, pp. 1119-1127.

Database CA [Online], Chemical Abstracts Service, Columbus, Ohio, US. Sun, Yu et al., Process for preparation of temperature resistant salt resistant polyether sulfonate, Database Accession No. 2013:638115; & CN 103 058 895 A (Jiangsu Maysta Chemical Co., Ltd.) Apr. 24, 2013, 3 pages.

Database CA [Online], Chemical Abstracts Service, Columbus, Ohio, US. Wang, Dongfang et al., Study on the interfacial tension of the water solution of a new anionic-non-ionic surfactant and crude oil, Database Accession No. 2009:578202; Xi'an Shiyou Daxue Xuebao, Ziran Kexueban (2008) 23(6), 70-73, 2 pages.

Arukula, Ravi et al., Investigations on anticorrosive, thermal, and mechanical properties of conducting polyurethanes with tetraaniline pendent groups, Polymers for Advanced Technologies (2018), 29, pp. 1620-1631.

Liu, J. Z. et al., Aryl Aminoalcohols as Corrosion Inhibitors for Carbon Steel in Chloride-Contaminated Simulated Concrete Pore Solution, Int. J. Electrochem. Sci., 11 (2016) pp. 1135-1151.

Sherif, E.M. et al., Inhibition of Copper Corrosion in 3.0% NaCl Solution by N-Phenyl-1,4-phenylenediamine, Journal of The Electrochemical Society, 152 (10) (2005), pp. B428-B433.

* cited by examiner

NON-CAUSTIC CLEANING COMPOSITIONS AND USES THEREOF

CROSS REFERENCE TO RELATED APPLICATIONS

This application claims priority to U.S. Provisional Patent Application Ser. No. 63/033,998 filed on Jun. 3, 2020, the disclosure of which is incorporated herein by reference in its entirety.

FIELD OF THE DISCLOSURE

Provided are detergent compositions comprising the compounds described herein that can be used, for example, in methods of cleaning articles and/or membranes.

BACKGROUND OF THE DISCLOSURE

Ethoxylated alkylphenols, particularly containing nonylphenol moiety as one of the building blocks have been used in the industry as surfactants for cleaning solutions and detergents. However, nonylphenols and their ethoxylated derivatives are known to be toxic, specifically as endocrine-hormone disrupters. Thus, there is a need to replace these chemistries with nonylphenol-free alternatives that are more environmentally friendly and to prepare cleaning compositions that are effective without the use of caustic agents (e.g., at a pH of 7 or less).

Because of the toxicity of nonylphenols and their ethoxylated derivatives, industrial use has largely shifted to linear/branched alcohol ethoxylates (LAEs). However, LAEs are generally not as effective as nonylphenol ethoxylates. Therefore, a need exists for novel surfactants that are effective in several industries in a non-caustic (e.g., at pH 7 or less) or for use as surfactants in cleaning applications.

BRIEF SUMMARY OF THE DISCLOSURE

Disclosed herein are methods of using compounds and compositions useful as detergent/cleaning compositions to aid in the cleaning of membranes or articles. For example, disclosed herein is a method for cleaning an article, the method comprising contacting the article with a cleaning composition comprising a compound of Formula 1 having the following structure:

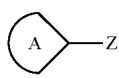

(1)

wherein A is an optionally substituted phenyl, naphthalene, indole, purine, pyridine, quinoline, isoquinoline, pyrimidine, pyrole, furan, thiophene, imidazole, or thiazole; and Z has a structure of moiety A or moiety B:

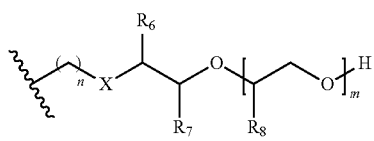

(A)

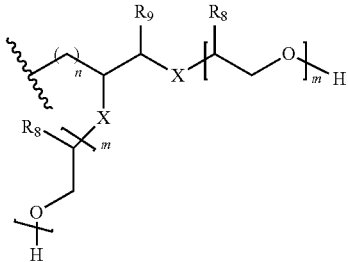

(B)

wherein X is —O—, —N($R_{10}$)—, —OC(O)—, —C(O)O—, —N($R_{10}$)C(O)—, —C(O)N($R_{10}$)—, —OC(O)O—, —OC(O)N($R_{10}$)—, —N($R_{10}$)C(O)O—, or —N($R_{10}$)C(O)N($R_{10}$)—; n is an integer from 0 to 10; $R_6$ and $R_9$ are independently hydrogen, alkyl, or aryl; $R_7$ is alkyl, aryl, or —(CH$_2$)z-O—$R_{11}$; $R_8$ is independently hydrogen, alkyl, or aryl; $R_{10}$ is hydrogen, alkyl, or Z; $R_{11}$ is hydrogen or alkyl; m is independently an integer from 3 to 20; and z is an integer from 1 to 10; and the cleaning composition has a pH of 7 or less.

The methods described herein can have the cleaning composition has a pH of about 1 to 7.

The moiety B can have the structure of moiety B1 or moiety B2:

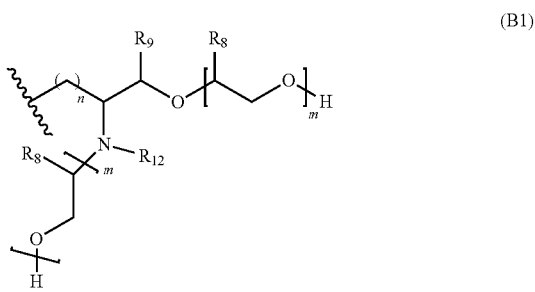

(B1)

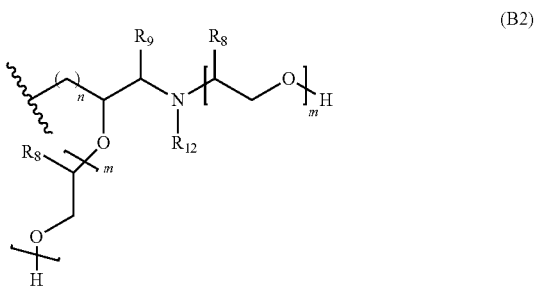

(B2)

wherein $R_9$ is independently hydrogen, alkyl, or aryl; and $R_{12}$ is independently $C_3$ to $C_{22}$ alkyl or alkenyl.

The methods described herein can have A is an optionally substituted phenyl, naphthyl, pyridyl, quinolyl, or isoquinolyl.

The method of claim 4, wherein A is an optionally substituted phenyl or naphthyl.

The disclosure is also directed to a method for cleaning an article, the method comprising contacting the article with a cleaning composition comprising a compound of Formula 2 having the following structure:

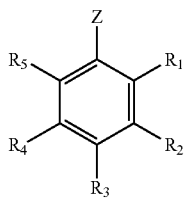
(2)

wherein $R_1$, $R_2$, $R_3$, $R_4$, and $R_5$ are independently hydrogen, Z, alkyl, alkoxyl, or two adjacent R groups combine to form a fused ring; Z has a structure of moiety A or moiety B:

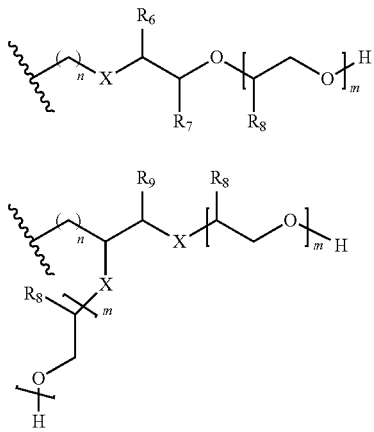

wherein X is —O—, —N($R_{10}$)—, —OC(O)—, —C(O)O—, —N($R_{10}$)C(O)—, —C(O)N($R_{10}$)—, —OC(O)O—, —OC(O)N($R_{10}$)—, —N($R_{10}$)C(O)O—, or —N($R_{10}$)C(O)N($R_{10}$)—; n is an integer from 0 to 10; $R_6$ and $R_9$ are independently hydrogen, alkyl, or aryl; $R_7$ is alkyl, aryl, or —(CH$_2$)z-O—$R_{11}$; $R_8$ is independently hydrogen, alkyl, or aryl; $R_{10}$ is hydrogen, alkyl, or Z; $R_{11}$ is hydrogen or alkyl; m is an integer from 3 to 20; and z is an integer from 1 to 10; and the cleaning composition has a pH of 7 or less.

The methods described herein have the cleaning composition having a pH of about 1 to 7, 2 to 7, 3 to 7, 4 to 7, or 5 to 7.

The moiety B structure has the structure of moiety B1 or moiety B2:

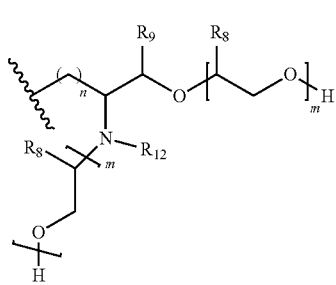
(B1)

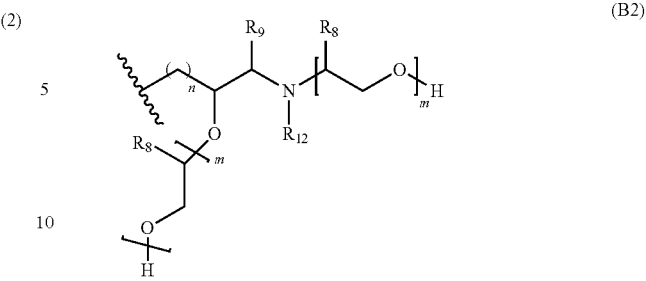
(B2)

wherein $R_9$ is independently hydrogen, alkyl, or aryl; and $R_{12}$ is independently $C_3$ to $C_{22}$ alkyl or alkenyl.

The methods described herein, wherein for the structures of Formula 2, at least one of $R_1$, $R_2$, $R_3$, $R_4$, and $R_5$ is Z.

The compounds can have the structure of Formula 3:

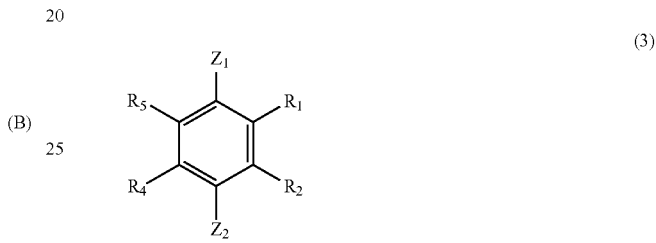
(3)

wherein $R_1$, $R_2$, $R_4$, and $R_5$ are independently hydrogen, alkyl, alkoxyl, or Z; and $Z_1$, $Z_2$, and Z independently have a structure of moiety A or moiety B:

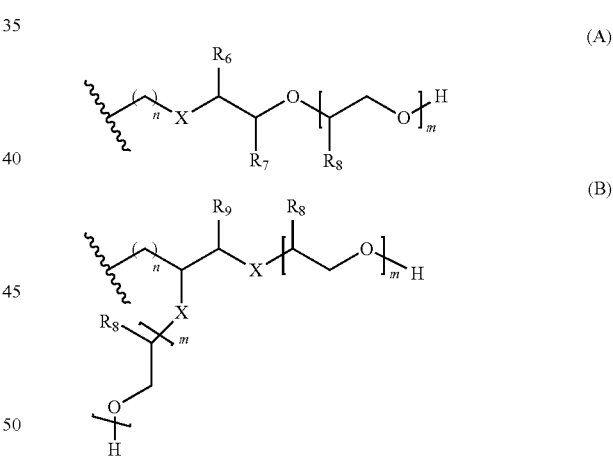

wherein X is —O— or —N($R_{10}$)—; n is an integer from 0 to 5; $R_6$ and $R_9$ are independently hydrogen or alkyl; $R_7$ is alkyl, or —(CH$_2$)z-O—$R_{11}$; $R_8$ is independently hydrogen, alkyl, or aryl; $R_{10}$ is hydrogen, alkyl, or Z; $R_{11}$ is hydrogen or alkyl; m is an integer from 3 to 20; z is an integer from 1 to 10.

The methods described herein, where for Formulae 1 to 3, $R_1$, $R_2$, $R_3$, $R_4$, and $R_5$ can be independently hydrogen or $C_1$ to $C_4$ alkyl.

For compounds of Formulae 1 to 3, $R_1$, $R_2$, $R_3$, $R_4$, and $R_5$ can be hydrogen.

The methods described herein, for compounds of Formulae 1 to 3, $R_6$ and $R_9$ can be hydrogen.

For the compounds of Formulae 1 to 3, $R_8$ can be hydrogen or methyl.

The compounds of Formulae 1 to 3 can have $R_7$ be —$(CH_2)z$-O—$R_{11}$.

The methods described herein can have the compounds of Formulae 1 to 3 have z be 1 to 3.

The compounds of Formulae 1 to 3 can have $R_{11}$ is $C_4$ to $C_{22}$ alkyl.

The methods of this disclosure can have the compounds of Formulae 1 to 3 have X be —O— or —N(R10)-.

The compounds of Formulae 1 to 3 can have X be —O—.

The compounds of Formulae 1 to 3 can have X be —N($R_{10}$)—.

The compounds of Formulae 1 to 3 can also have $R_{10}$ be hydrogen.

The methods described herein can have the compound of Formula 1 or 2 have a structure corresponding to

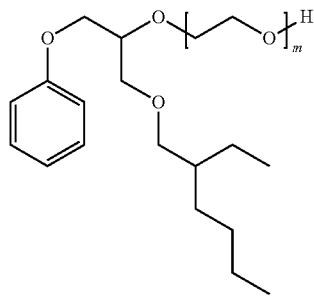

wherein m is an integer from 6 to 12.

The compounds of Formula 1 or 2 can have m be an integer or 9 or 10.

The methods described herein can have the article be a metal surface, a glass surface, a fabric, a ware, a polycarbonate surface, a polysulfone surface, a melamine surface, a ceramic surface, a porcelain surface, a membrane, or a combination thereof.

The cleaning composition further comprises a building agent.

The building agent can be an enzyme, an oxidizing agent, a condensed phosphate, an alkali metal silicate, an alkali metal metasilicate, a phosphonate, an amino carboxylic acid, a carboxylic acid polymer, or a combination thereof.

Preferably, the article is a fabric, a ware, or a membrane.

The membrane can be a membrane used in a dairy process.

The membrane can be a microfiltration membrane, an ultrafiltration membrane, a nanofiltration membrane, a reverse osmosis membrane, or a combination thereof.

The article can be soiled with a protein or an oily soil.

The cleaning compositions used in the methods described herein can have a pH of about 2 to 7, a pH of about 3 to 7, a pH of about 4 to 7, or a pH of about 5 to 7.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION OF THE DISCLOSURE

Figure 1:
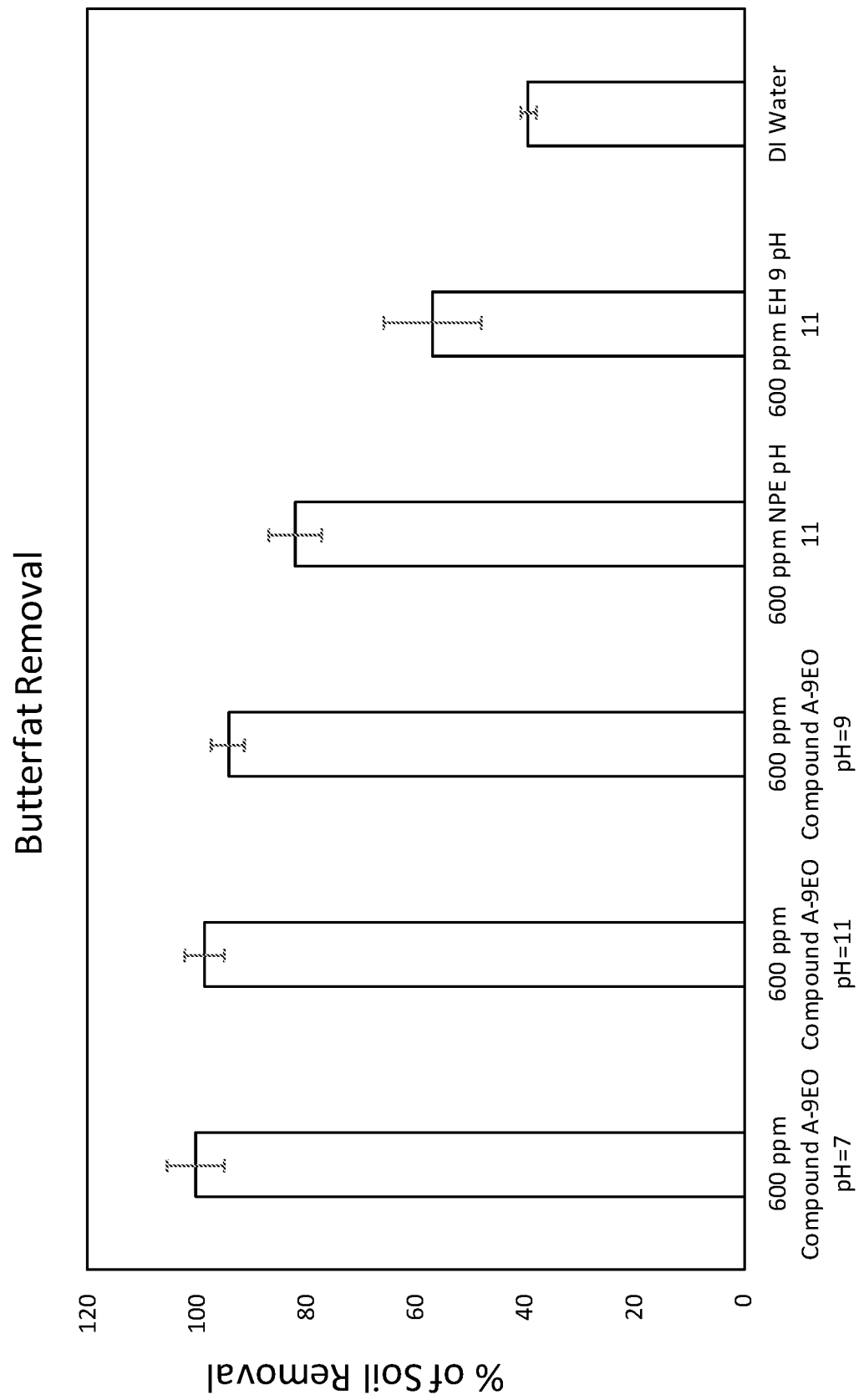
FIG. 1 shows the percent butterfat soil removal calculated from the weight of the cleaned coupons compared to the dried soiled coupons for Compound A-9EO, NPE 9.5, and EH9 at pH 7 9, and 11 described in Example 4.

Compounds, compositions, and methods for using these compounds and compositions in detergent or cleaning compositions are provided. These compounds, compositions, and methods are particularly directed to cleaning compositions and methods that have advantageous cleaning properties at a pH of 7 or less. In particular, the compounds, compositions, and methods described herein can also be used as general surfactants in detergent compositions or in methods of cleaning articles or membranes.

Disclosed herein are methods of using compounds and compositions useful as detergent/cleaning compositions to aid in the cleaning of membranes or articles. For example, disclosed herein is a method for cleaning an article, the method comprising contacting the article with a cleaning composition comprising a compound of Formula 1 having the following structure:

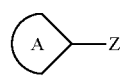

(1)

wherein A is an optionally substituted phenyl, naphthalene, indole, purine, pyridine, quinoline, isoquinoline, pyrimidine, pyrole, furan, thiophene, imidazole, or thiazole; and Z has a structure of moiety A or moiety B:

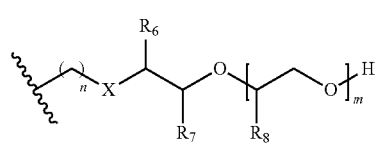

(A)

(B)

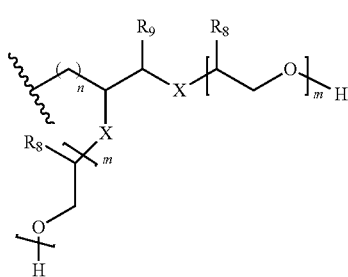

wherein X is —O—, —N(R$_{10}$)—, —OC(O)—, —C(O)O—, —N(R$_{10}$)C(O)—, —C(O)N(R$_{10}$)—, —OC(O)O—, —OC(O)N(R$_{10}$)—, —N(R$_{10}$)C(O)O—, or —N(R$_{10}$)C(O)N(R$_{10}$)—; n is an integer from 0 to 10; R$_6$ and R$_9$ are independently hydrogen, alkyl, or aryl; R$_7$ is alkyl, aryl, or —(CH$_2$)z-O—R$_{11}$; R$_8$ is independently hydrogen, alkyl, or aryl; R$_{10}$ is hydrogen, alkyl, or Z; R$_{11}$ is hydrogen or alkyl; m is independently an integer from 3 to 20; and z is an integer from 1 to 10; and the cleaning composition has a pH of 7 or less.

The methods described herein can have the cleaning composition has a pH of about 1 to 7, a pH of about 2 to 7, a pH of about 3 to 7, a pH of about 4 to 7, or a pH of about 5 to 7.

The moiety B can have the structure of moiety B1 or moiety B2:

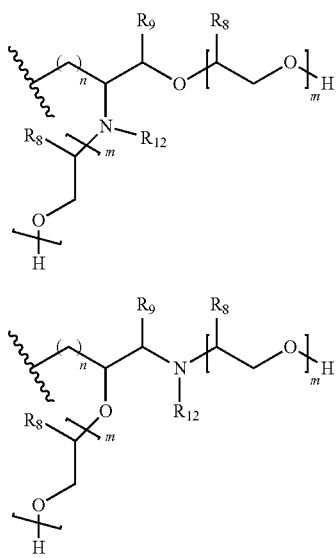

wherein R$_9$ is independently hydrogen, alkyl, or aryl; and R$_{12}$ is independently C$_3$ to C$_{22}$ alkyl or alkenyl.

The methods described herein can have A be an optionally substituted phenyl, naphthyl, pyridyl, quinolyl, or isoquinolyl.

The methods can also have A be an optionally substituted phenyl or naphthyl.

The disclosure is also directed to a method for cleaning an article, the method comprising contacting the article with a cleaning composition comprising a compound of Formula 2 having the following structure:

(2)

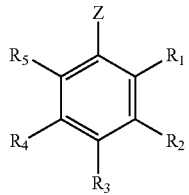

wherein R$_1$, R$_2$, R$_3$, R$_4$, and R$_5$ are independently hydrogen, Z, alkyl, alkoxyl, or two adjacent R groups combine to form a fused ring; Z has a structure of moiety A or moiety B:

(A)

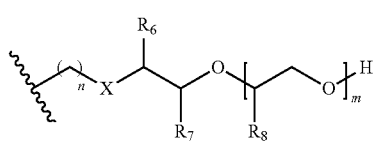

(B)

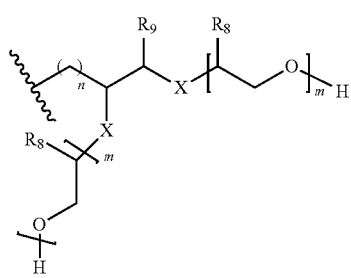

wherein X is —O—, —N(R$_{10}$)—, —OC(O)—, —C(O)O—, —N(R$_{10}$)C(O)—, —C(O)N(R$_{10}$)—, —OC(O)O—, —OC(O)N(R$_{10}$)—, —N(R$_{10}$)C(O)O—, or —N(R$_{10}$)C(O)N(R$_{10}$)—; n is an integer from 0 to 10; R$_6$ and R$_9$ are independently hydrogen, alkyl, or aryl; R$_7$ is alkyl, aryl, or —(CH$_2$)z-O—R$_{11}$; R$_8$ is independently hydrogen, alkyl, or aryl; R$_{10}$ is hydrogen, alkyl, or Z; R$_{11}$ is hydrogen or alkyl; m is an integer from 3 to 20; and z is an integer from 1 to 10; and the cleaning composition has a pH of 7 or less.

The methods described herein have the cleaning composition having a pH of about 1 to 7, 2 to 7, 3 to 7, 4 to 7, or 5 to 7.

The moiety B structure has the structure of moiety B1 or moiety B2:

(B1)

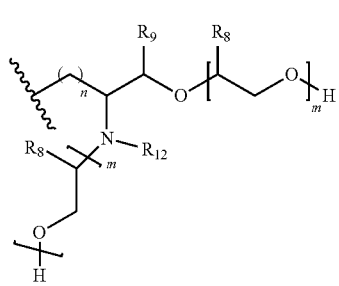

-continued (B2)
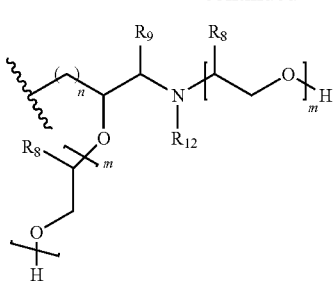

wherein $R_9$ is independently hydrogen, alkyl, or aryl; and $R_{12}$ is independently $C_3$ to $C_{22}$ alkyl or alkenyl.

The methods described herein, wherein for the structures of Formula 2, at least one of $R_1$, $R_2$, $R_3$, $R_4$, and $R_5$ is Z.

The compounds can have the structure of Formula 3:

(3)
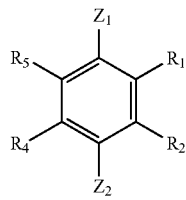

wherein $R_1$, $R_2$, $R_4$, and $R_5$ are independently hydrogen, alkyl, alkoxyl, or Z; and $Z_1$, $Z_2$, and Z independently have a structure of moiety A or moiety B:

(A)

(B)
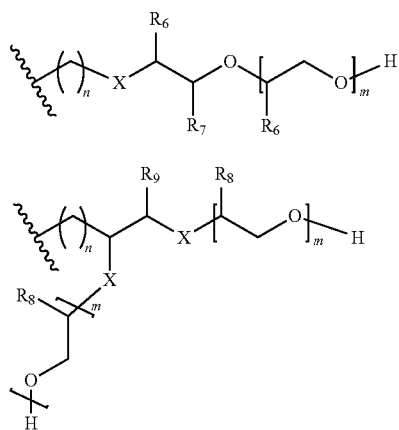

wherein X is —O— or —N($R_{10}$)—; n is an integer from 0 to 5; $R_6$ and $R_9$ are independently hydrogen or alkyl; $R_7$ is alkyl, or —(CH$_2$)z-O—$R_{11}$; $R_8$ is independently hydrogen, alkyl, or aryl; $R_{10}$ is hydrogen, alkyl, or Z; $R_{11}$ is hydrogen or alkyl; m is an integer from 3 to 20; z is an integer from 1 to 10.

The methods described herein, where for Formulae 1 to 3, $R_1$, $R_2$, $R_3$, $R_4$, and $R_5$ can be independently hydrogen or $C_1$ to $C_4$ alkyl.

For compounds of Formulae 1 to 3, $R_1$, $R_2$, $R_3$, $R_4$, and $R_5$ can be hydrogen.

The methods described herein, for compounds of Formulae 1 to 3, $R_6$ and $R_9$ can be hydrogen.

For the compounds of Formulae 1 to 3, $R_8$ can be hydrogen or methyl.

The compounds of Formulae 1 to 3 can have $R_7$ be —(CH$_2$)z-O—$R_{11}$.

The methods described herein can have the compounds of Formulae 1 to 3 have z be 1 to 3.

The compounds of Formulae 1 to 3 can have $R_{11}$ is $C_4$ to $C_{22}$ alkyl.

The methods of this disclosure can have the compounds of Formulae 1 to 3 have X be —O— or —N($R_{10}$)—.

The compounds of Formulae 1 to 3 can have X be —O—.

The compounds of Formulae 1 to 3 can have X be —N($R_{10}$)—.

The compounds of Formulae 1 to 3 can also have $R_{10}$ be hydrogen.

The methods described herein can have the compound of Formula 1 or 2 have a structure corresponding to

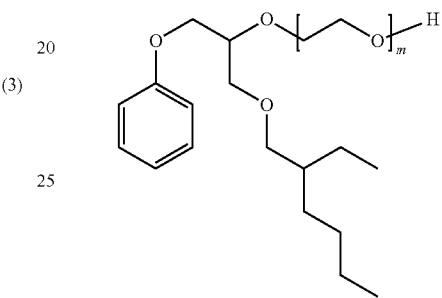

wherein m is an integer from 6 to 12.

The compounds of Formula 1 or 2 can have m be an integer or 9 or 10.

The methods described herein can have the article be a metal surface, a glass surface, a fabric, a ware, a polycarbonate surface, a polysulfone surface, a melamine surface, a ceramic surface, a porcelain surface, a membrane, or a combination thereof.

The cleaning composition further comprises a building agent.

The building agent can be an enzyme, an oxidizing agent, a condensed phosphate, an alkali metal silicate, an alkali metal metasilicate, a phosphonate, an amino carboxylic acid, a carboxylic acid polymer, or a combination thereof.

Preferably, the article is a fabric, a ware, or a membrane.

The membrane can be a membrane used in a dairy process.

The membrane can be a microfiltration membrane, an ultrafiltration membrane, a nanofiltration membrane, a reverse osmosis membrane, or a combination thereof.

The article can be soiled with a protein or an oily soil.

Also disclosed are methods of preparing a compound described herein, the method comprising reacting compound (A) with compound (B) to form compound (C); and further reacting compound (C) with compound (D) to form compound (E)

(A)
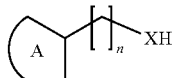

(B)
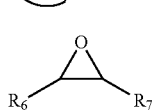

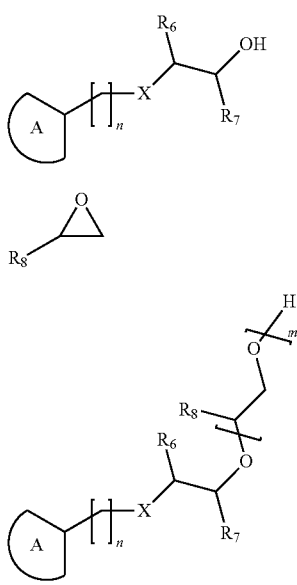

(C)

(D)

(E)

wherein A, X, $R_6$, $R_7$, $R_8$, $R_9$, n and m are as defined in connection with the compounds herein above.

Another method of preparing a compound described herein comprises reacting compound (F) with R—XH and an acid catalyst to form compound (G); and further reacting compound (G) with compound (D) to form compound (H); or

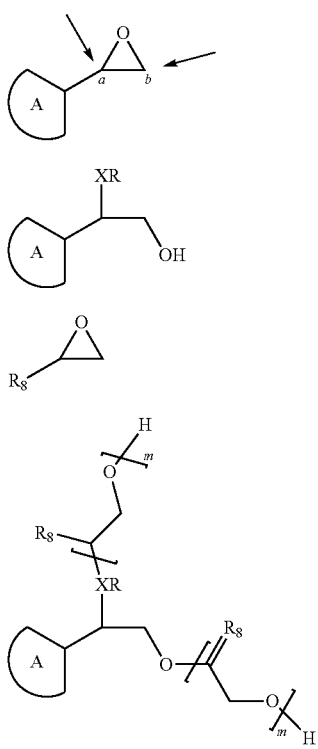

(F)

(G)

(D)

(H)

reacting compound (F) with R—XH and a base catalyst to form compound (J); and further reacting compound (J) with compound (D) to form compound (K);

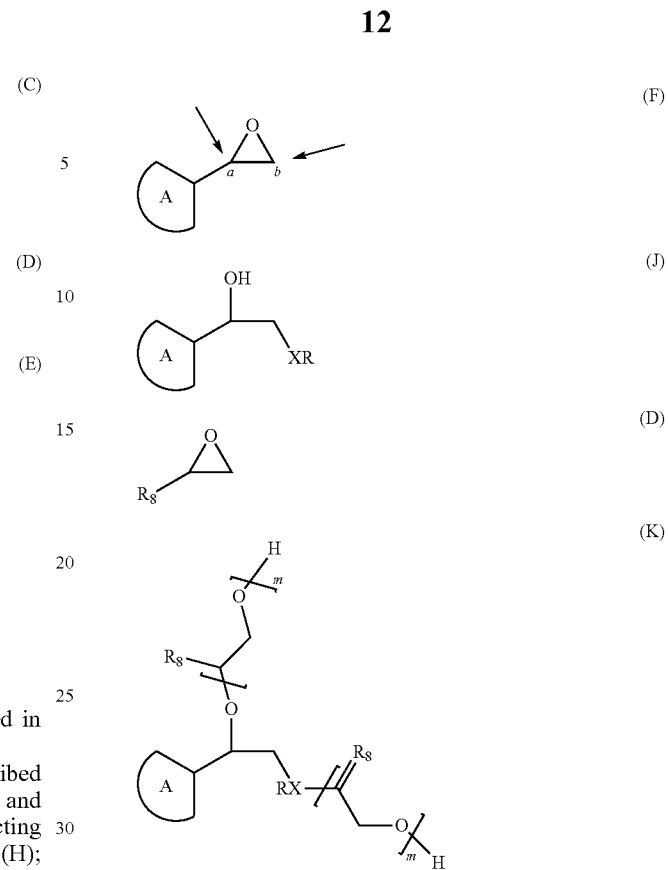

(F)

(J)

(D)

(K)

wherein A, X, $R_6$, $R_7$, $R_8$, $R_9$, n and m are as defined in connection with the compounds herein; and R is independently hydrogen or alkyl.

The compounds having the structure of Formula 1, 2, or 3 can be prepared by the following synthetic schemes:

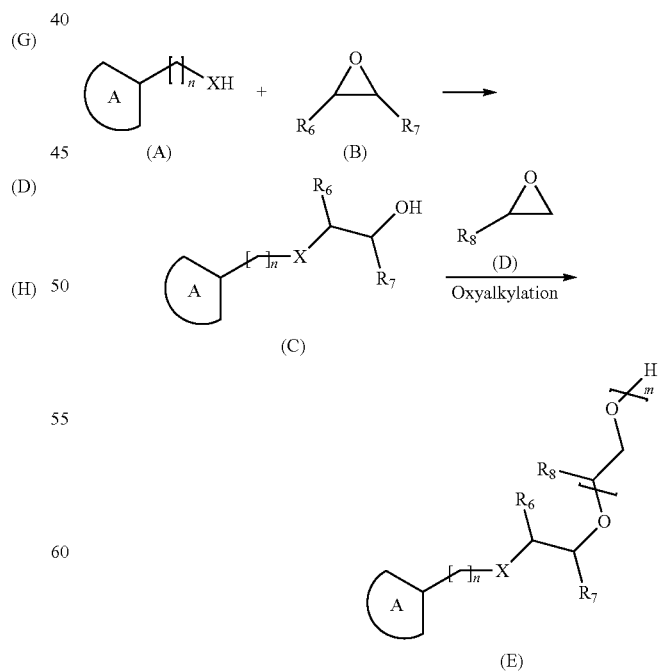

wherein A, X, $R_6$, $R_7$, $R_8$, m, and n are defined as above.

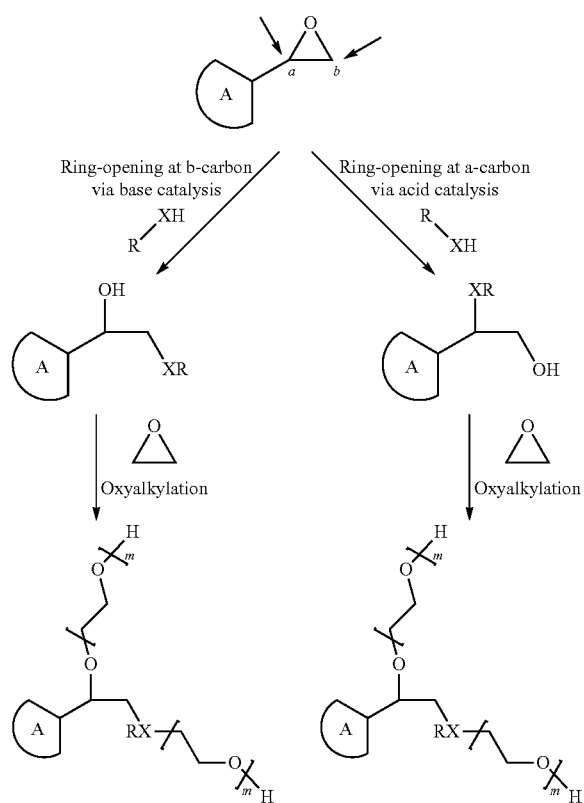

wherein A, X, m, and n are defined as above, and R is independently hydrogen or alkyl.

Compositions

The compounds described herein are also useful as general surfactants, e.g., for use in detergents or cleaning solutions.

Exemplary cleaning or detergent compositions include, but are not limited to dishwashing detergents, rinse aids, floor cleaners, presoaks, manual cleaners, degreasers, hard surface cleaners, laundry detergents, sanitizers, disinfectants, food and beverage equipment cleaners, and dairy cleaners. Cleaning compositions and detergent compositions comprising a compound of formula 1, 2 or 3, as described herein, are provided. These compositions can be used for a variety of cleaning applications as described above, but are particularly useful as detergents or membrane cleaners.

The cleaning and/or detergent compositions described herein may comprise a compound of formula 1, 2, or 3 as described herein and at least one of a builder, a chelating agent, a scale inhibitor, a surfactant or any combination thereof.

The detergent and/or cleaning compositions can comprise from about 0.001 to about 99 wt. %, of the compound of Formula 1, 2, or 3, based on the total weight of the detergent and/or cleaning composition as described herein.

Building Agents

Therefore, a cleaning composition or a detergent composition is provided comprising a building agent and a compound of Formula 1, 2, or 3 as described herein.

The detergent composition or cleaning composition can comprise from about 0.1 to about 90 wt. %, of the building agent, based on the total weight of the detergent composition or the cleaning composition.

Examples of suitable building agents include, but are not limited to alkali metal carbonates, alkali metal hydroxides, and alkali metal silicates. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to: sodium or potassium hydroxide. The alkali metal hydroxide may be added to the composition in any form known in the art, including as solid beads, dissolved in an aqueous solution, or a combination thereof. Examples of alkali metal silicates include, but are not limited to sodium or potassium silicate or polysilicate, sodium or potassium metasilicate and hydrated sodium or potassium metasilicate or a combination thereof.

The building agent can comprise an alkaline detergent builder. For example, the building agent can comprise an enzyme, an oxidizing agent, a condensed phosphate, an alkali metal carbonate, an alkali metal silicate, an alkali metal metasilicate, a phosphonate, an amino carboxylic acid, a carboxylic acid polymer, or a combination thereof. The detergent composition or cleaning composition can further comprise chelants, surfactants, enzymes, or other components as described herein below.

Chelants

The cleaning composition or detergent composition disclosed herein may also comprise a chelant. Chelants include, but are not limited to, chelating agents (chelators), sequestering agents (sequestrants), and the like. Examples of chelants include, but are not limited to, phosphonates, phosphates, aminocarboxylates and their derivatives, pyrophosphates, polyphosphates, ethylenediamine and ethylenetriamine derivatives, hydroxyacids, and mono-, di-, and tri-carboxylates and their corresponding acids. Other exemplary chelants include aluminosilicates, nitroloacetates and their derivatives, and mixtures thereof.

Suitable aminocarboxylic acids according to the disclosure include, but are not limited to, methylglycinediacetic acid (MGDA), glutamic acid-N,N-diacetic acid (GLDA), N-hydroxyethylaminodiacetic acid, ethylenediaminetetraacetic acid (EDTA) (including tetra sodium EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), ethylenediaminesuccinic acid (EDDS), 2-hydroxyethyliminodiacetic acid (HEIDA), iminosuccinic acid (IDS), 3-hydroxy-2-2'-iminodisuccinic acid (HIDS) and other similar acids or salts thereof having an amino group with a carboxylic acid substituent. Additional description of suitable aminocarboxylates suitable for use as chelating agents and/or sequestrants is set forth in Kirk-Othmer, Encyclopedia of Chemical Technology, Third Edition, volume 5, pages 339-366 and volume 23, pages 319-320, the disclosure of which is incorporated by reference herein.

Chelants can be water soluble, and/or biodegradable. Other exemplary chelants include TKPP (tetrapotassium pyrophosphate), PAA (polyacrylic acid) and its salts, phosphonobutane carboxylic acid, Alanine,N,N-bis(carboxymethyl)-,trisodium salt, and sodium gluconate.

The chelant can be free of phosphorus. The chelant may also serve as a solidifying agent to help form the solid composition, such as sodium salts of citric acid.

Preferably, the chelant is a sodium salt of aminocarboxylates. More preferably, the chelant is methyl glycine diacetic acid (MGDA).

Alternatively, the cleaning composition or detergent composition disclosed herein can be free of a chelant, detergent builder, or both. Alternatively, the cleaning composition or detergent composition disclosed herein can be free of a chelant, detergent builder, or both that contain phosphorus.

Scale Inhibitors

The cleaning composition or detergent composition can further comprise one or more scale inhibitors. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), mono-, bis- and oligomeric phosphinosuccinic acid (PSO) derivatives, polycarboxylic acid, hydrophobically modified polycarboxylic acid, and salts of a polymaleic acid/acrylic acid/acrylamidomethyl propane sulfonate terpolymer (PMA/AA/AMPS). Suitable polycarboxylic acid polymers may comprise of one or more monomers selected from the group consisting of acrylic acid, methacrylic acid, ethacrylic acid, maleic acid, maleic anhydride, and itaconic acid.

Alternatively, the cleaning composition or detergent composition disclosed herein can be free of a scale inhibitor.

Enzymes

The cleaning compositions or detergent compositions disclosed herein can include an enzyme. An enzyme in the cleaning compositions or detergent compositions enhances removal of soils, prevents re-deposition, and/or reduces foam during applications of the cleaning compositions or their use solutions. The function of an enzyme is to break down adherent soils, such as starch or proteinaceous materials, which are typically found in soiled surfaces and removed by a cleaning composition or detergent compositions into a wash water source.

Exemplary types of enzymes which can be incorporated into the cleaning compositions or detergent compositions disclosed herein include, but are not limited to, amylase, protease, lipase, cellulase, cutinase, gluconase, peroxidase, and/or mixtures thereof. A cleaning composition disclosed herein may employ more than one enzyme, from any suitable origin, such as vegetable, animal, bacterial, fungal or yeast origin. The enzyme can be a protease. As used herein, the terms "protease" or "proteinase" refer enzymes that catalyze the hydrolysis of peptide bonds.

As understood by one skilled in the art, enzymes are designed to work with specific types of soils. For example, ware wash applications may use a protease enzyme as it is effective at the high temperatures of the ware wash machines and is effective in reducing protein-based soils. Protease enzymes are particularly advantageous for cleaning soils containing protein, such as blood, cutaneous scales, mucus, grass, food (e.g., egg, milk, spinach, meat residue, tomato sauce), or the like. Protease enzymes are capable of cleaving macromolecular protein links of amino acid residues and convert substrates into small fragments that are readily dissolved or dispersed into the aqueous use solution. Proteases are often referred to as detersive enzymes due to the ability to break soils through the chemical reaction known as hydrolysis. Protease enzymes can be obtained, for example, from *Bacillus subtilis, Bacillus licheniformis* and *Streptomyces griseus*. Protease enzymes are also commercially available as serine endoproteases.

Examples of commercially-available protease enzymes are available under the following trade names: ESPERASE®, PURAFECT®, PURAFECT L®, PURAFECT Ox®, EVERLASE®, LIQUANASE®, SAVINASE®, Prime L, Prosperase and BLAP.

The enzyme to be included into the cleaning composition may be an independent entity and/or may be formulated in combination with the cleaning composition. For example, the enzyme may be formulated into a cleaning composition in either liquid or solid formulations. In addition, enzyme compositions may be formulated into various delayed or controlled release formulations. For example, a solid molded cleaning composition may be prepared without the addition of heat. Enzymes can denature by heat so the use of enzymes within the cleaning compositions may require methods of forming cleaning compositions that do not rely upon heat as a step in the formation process, such as solidification.

The enzyme composition may be provided commercially in a solid (i.e., puck, powder, etc.) or liquid formulation. Commercially-available enzymes are generally combined with stabilizers, buffers, cofactors and inert vehicles. The actual active enzyme content depends upon the method of manufacture, as is understood in the art.

Alternatively, the enzyme composition may be provided separate from the cleaning or detergent composition, and, for example, be added directly to a use solution of a cleaning or detergent composition or a wash liquor, or wash water of an application, e.g. dishwasher.

Surfactant

The cleaning composition or detergent composition can also comprise a surfactant. The surfactant can be an anionic, cationic, nonionic, amphoteric, zwitterionic, and/or gemini surfactant.

Anionic Surfactants

The cleaning composition or detergent composition can comprise an anionic surfactant. Anionic surfactants are surface active substances in which the charge on the hydrophobe is negative; or surfactants in which the hydrophobic section of the molecule carries no charge unless the pH is elevated to neutrality or above (e.g., carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionic surfactants are excellent detersive surfactants and are therefore favored additions to heavy duty cleaning compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g., alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g., alkyl carboxyls). Secondary carboxylates useful in the present compositions include those which contain a carboxyl unit connected to a secondary carbon. The secondary carbon can be in a ring structure, e.g., as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the group-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g., N-acyl sarcosinates), taurates (e.g., N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \qquad (3)$$

in which R is a $C_8$ to $C_{22}$ alkyl group or

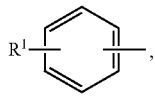

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

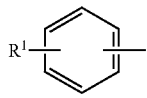

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include: NEODOX 23-4, a $C_{12}$-$C_{13}$ alkyl polyethoxy (4) carboxylic acid (Shell Chemical), and EMCOL CNP-110, a C9 alkylaryl polyethoxy (10) carboxylic acid (Witco Chemical). Carboxylates are also available from Clariant, e.g., the product SANDOPAN DTC, a C13 alkyl polyethoxy (7) carboxylic acid.

In some embodiments, the cleaning composition or detergent composition disclosed herein is free of an anionic surfactant.

Nonionic Surfactants

The cleaning composition or detergent composition can comprise a nonionic surfactant.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. Useful nonionic surfactants include block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Suitable nonionic surfactants also include condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names IGEPAL® manufactured by Rhone-Poulenc and TRITON® manufactured by Union Carbide.

The nonionic surfactants can also be condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names LUTENSOL™, DEHYDOL™ manufactured by BASF, NEODOL™ manufactured by Shell Chemical Co. and ALFONIC™ manufactured by Vista Chemical Co.

Nonionic surfactants also include condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names DISPONIL or AGNIQUE manufactured by BASF and LIPOPEG™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this disclosure for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty esters or acylated carbohydrates to compositions containing amylase and/or lipase enzymes because of potential incompatibility.

Examples of nonionic low foaming surfactants include, but are not limited to, compounds which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics are manufactured by BASF Corporation under the trade name PLURONIC™ R surfactants. Likewise, the TETRONIC™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds which are modified by "capping" or "end blocking" the terminal hydroxy group or groups (of multifunctional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionic surfactants include, but are not limited to:
(a) the alkylphenoxypolyethoxyalkanols of U.S. Pat. No. 2,903,486 issued Sep. 8, 1959 to Brown et al. and represented by the formula

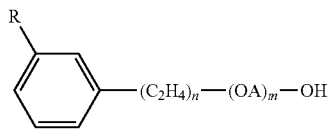

in which R is an alkyl group of 8 to 9 carbon atoms, A is an alkylene chain of 3 to 4 carbon atoms, n is an integer of 7 to 16, and m is an integer of 1 to 10.
(b) The polyalkylene glycol condensates of U.S. Pat. No. 3,048,548 issued Aug. 7, 1962 to Martin et al. having alternated hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.
(c) The defoaming nonionic surfactants disclosed in U.S. Pat. No. 3,382,178 issued May 7, 1968 to Lissant et al. having the general formula Z[(OR)nOH]z wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.
(d) The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.
(e) The conjugated polyoxyalkylene compounds described in U.S. Pat. No. 2,674,619, issued Apr. 6, 1954 to Lundsted et al. having the formula $Y[(C_3H_6O)_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this disclosure correspond to the formula: $P[(C_3H_6O)_n (C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R^2CONR^1Z$ in which: $R^1$ is H, $C_1$-$C_4$ hydrocarbyl, 2-hydroxy ethyl, 2-hydroxy propyl, ethoxy, propoxy group, or a mixture thereof; $R^2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside). The inter-saccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R^6CON(R^7)_2$ in which $R^6$ is an alkyl group containing from 7 to 21 carbon atoms and each $R^7$ is independently hydrogen, $C_1$-$C_4$ alkyl, $C_1$-$C_4$ hydroxyalkyl, or $—(C_2H_4O)_xH$, where x is in the range of from 1 to 3.

A useful class of non-ionic surfactants include the class defined as alkoxylated amines or, most particularly, alcohol alkoxylated/aminated/alkoxylated surfactants. These nonionic surfactants may be at least in part represented by the general formulae: $R^{20}—(PO)_sN—(EO)_tH$, $R^{20}—(PO)_sN—(EO)_tH(EO)_tH$, and $R^{20}—N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, and t is 1-10, preferably 2-5. Other variations on the scope of these compounds may be represented by the alternative formula: $R^{20}—(PO)_v—N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes SURFONIC™ PEA 25 Amine Alkoxylate. Preferred nonionic surfactants for the compositions of the disclosure include alcohol alkoxylates, EO/PO block copolymers, alkylphenol alkoxylates, and the like.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present technology. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Suitable nonionic surfactants suitable for use with the compositions disclosed herein include alkoxylated surfactants. Suitable alkoxylated surfactants include EO/PO copolymers, fully capped or partially EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-(EO)5(PO)4) and Dehypon LS-36 (R-(EO)3(PO)6); and capped alcohol alkoxylates, such as Plurafac LF221 and Tegoten EC11; mixtures thereof, or the like.

When the composition is not a cleaning composition, it can be free of a nonionic surfactant.

Semi-Polar Nonionic Surfactants

The cleaning composition or detergent composition can comprise a semi-polar nonionic surfactant.

The semi-polar type of nonionic surfactants is another class of nonionic surfactants useful in compositions disclosed herein. Generally, semi-polar nonionic surfactants are high foaming agents and foam stabilizers, which can limit their application in CIP systems. However, in some embodiments designed for high foaming composition or cleaning composition, semi-polar nonionic surfactants would have immediate utility. The semi-polar nonionic surfactants include, but are not limited to, the amine oxides, phosphine oxides, sulfoxides and their alkoxylated derivatives.

Amine oxides are tertiary amine oxides corresponding to the general formula:

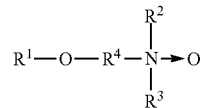

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water-soluble phosphine oxides having the following structure:

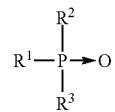

wherein the arrow is a conventional representation of a semi-polar bond; and, R1 is an alkyl, alkenyl or hydroxyalkyl moiety ranging from 10 to about 24 carbon atoms in chain length; and, R2 and R3 are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

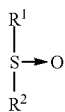

wherein the arrow is a conventional representation of a semi-polar bond; and, R1 is an alkyl or hydroxyalkyl moiety of about 8 to about 28 carbon atoms, from 0 to about 5 ether linkages and from 0 to about 2 hydroxyl substituents; and R2 is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Alternatively, the cleaning composition or detergent composition disclosed herein can be free of a semi-polar nonionic surfactant.

Cationic Surfactants

The cleaning composition or detergent composition can comprise a cationic surfactant.

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure $R_nX+Y-$ and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, and more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

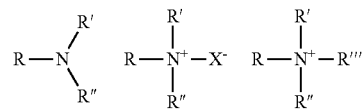

in which, R represents an alkyl chain, R', R", and R'" may be either alkyl chains or aryl groups or hydrogen and X represents an anion. The amine salts and quaternary ammonium compounds are preferred for practical use due to their high degree of water solubility.

Most large volume commercial cationic surfactants can be subdivided into four major classes and additional sub-groups known to those skilled in the art and described in "Surfactant Encyclopedia", Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions disclosed herein include those having the formula $R^1{}_mR^2{}_xY_LZ$ wherein each $R^1$ is an organic group containing a straight or branched alkyl or alkenyl group optionally substituted with up to three phenyl or hydroxy groups and optionally interrupted by up to four of the following structures:

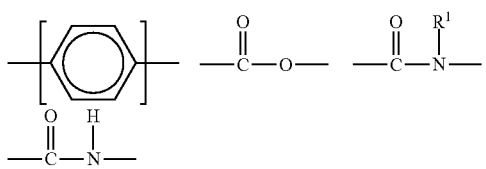

or an isomer or mixture of these structures, and which contains from about 8 to 22 carbon atoms. The $R^1$ groups can additionally contain up to 12 ethoxy groups and m is a number from 1 to 3. Preferably, no more than one R1 group in a molecule has 16 or more carbon atoms when m is 2 or more than 12 carbon atoms when m is 3. Each R2 is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y is can be a group including, but not limited to:

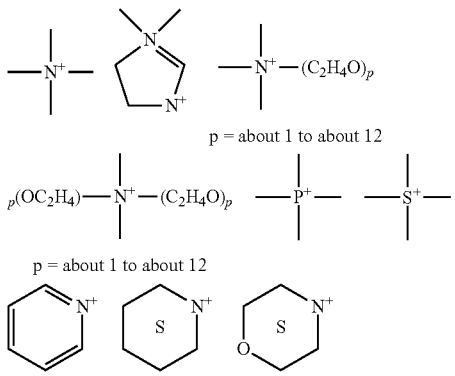

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water-soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Alternatively, the cleaning composition or detergent composition disclosed herein can be free of a cationic surfactant.

Amphoteric Surfactants

The cleaning composition or detergent composition can comprise an amphoteric surfactant.

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present disclosure generally have the general formula:

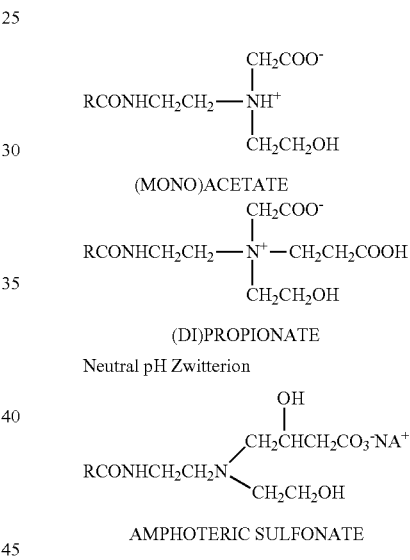

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: cocoamphopropionate, cocoamphocarboxy-propionate, cocoamphoglycinate, cocoamphocarboxy-glycinate, cocoamphopropyl-sulfonate, and cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterionic Surfactants.

Long chain N-alkylamino acids are readily prepared by reaction $RNH_2$, in which $R=C_8-C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application include alkyl beta-amino dipropionates, RN(C$_2$H$_4$COOM)$_2$ and RNHC$_2$H$_4$COOM. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: C$_{12}$-alkyl-C(O)—NH—CH$_2$—CH$_2$—N+(CH$_2$—CH$_2$—CO$_2$Na)$_2$—CH$_2$—CH$_2$—OH or C$_{12}$-alkyl-C(O)—N(H)—CH$_2$—CH$_2$—N+(CH$_2$—CO$_2$Na)$_2$—CH$_2$—CH$_2$—OH. Disodium cocoampho dipropionate is one suitable amphoteric surfactant and is commercially available under the tradename MIRANOL™ FBS from Rhodia Inc., Cranbury, N.J. Another suitable coconut derived amphoteric surfactant with the chemical name disodium cocoampho diacetate is sold under the tradename MIRATAINE™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Alternatively, the cleaning composition or detergent composition disclosed herein can be free of an amphoteric surfactant.

Zwitterionic Surfactants

The cleaning composition or detergent composition can comprise a zwitterionic surfactant.

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionic surfactants generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

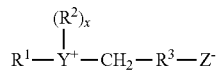

wherein R1 contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; R$^2$ is an alkyl or monohydroxy alkyl group containing 1 to 3 carbon atoms; x is 1 when Y is a sulfur atom and 2 when Y is a nitrogen or phosphorus atom, R$^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said cleaning composition surfactants can be straight or branched and saturated or unsaturated.

The zwitterionic surfactant suitable for use in the present compositions includes a betaine of the general structure:

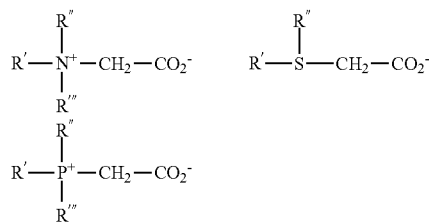

wherein R', R", and R'" are linear or branched alkyl or alkyl ether groups.

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; C$_{12-14}$ acylamidopropylbetaine; C$_{8-14}$ acylamidohexyldiethyl betaine; 4-C$_{14-16}$ acylmethylamidodiethylammonio-1-carboxybutane; C$_{16-18}$ acylamidodimethylbetaine; C$_{12-16}$ acylamidopentanediethylbetaine; and C$_{12-16}$ acylmethylamidodimethylbetaine.

Sultaines useful in the present disclosure include those compounds having the formula (R(R$^1$)$_2$N+R$^2$SO$_3$—, in which R is a C$_6$-C$_{18}$ hydrocarbyl group, each R$^1$ is typically independently C$_1$-C$_3$ alkyl, e.g., methyl, and R$^2$ is a C$_1$-C$_6$ hydrocarbyl group, e.g., a C$_1$-C$_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Alternatively, the detergent composition or cleaning composition disclosed herein can be free of a zwitterionic surfactant.

Gemini Surfactants

The cleaning composition or detergent composition can comprise a Gemini surfactant.

While conventional surfactants generally have one hydrophilic group and one hydrophobic group, a Gemini surfactant has at least two hydrophobic groups and at least two hydrophilic groups. These surfactants have the general formula: A1-G-A2 and get their name because they comprise two surfactant moieties (A1, A2) joined by a spacer (G), wherein each surfactant moiety (A1, A2) has a hydrophilic group and a hydrophobic group. Generally, the two surfactant moieties (A1, A2) are the same, but they can be different.

The Gemini surfactants may be anionic, nonionic, cationic or amphoteric. The hydrophilic and hydrophobic groups of each surfactant moiety (A1, A2) may be any of those known to be used in conventional surfactants having one hydrophilic group and one hydrophobic group. For example, a typical nonionic Gemini surfactant, e.g., a bis-polyoxyethylene alkyl ether, would contain two polyoxyethylene alkyl ether moieties.

Each moiety would contain a hydrophilic group, e.g., polyethylene oxide, and a hydrophobic group, e.g., an alkyl chain.

Anionic and nonionic Gemini surfactants include those of the formula:

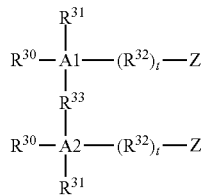

wherein $R^{30}$ is independently $C_1$ to $C_{22}$ alkyl, $R^{34}$—C(O)—, or $R^{34}$—B—$R^{35}$—, wherein $R^{34}$ is $C_1$ to $C_{22}$ alkyl, $R^{35}$ is $C_1$ to $C_{12}$ alkyl, and B is an amide group, —C(O)N($R^{36}$)—, an amino group —N($R^{36}$)—, a carboxyl group —C(O)—O—, a carbonyl group, or a polyether group —(EO)$_a$(PO)$_b$—, wherein EO represents ethyleneoxy radicals, PO represents propyleneoxy radicals, a and b are numbers of from 0 to 100, a is preferably from about 0 to about 30 and b is preferably from about 0 to 10, wherein the sum of a and b is at least one, and the EO and PO radicals can be randomly mixed or in discrete blocks, and $R^{36}$ is hydrogen or $C_1$ to $C_6$ alkyl.

$R^{31}$ is independently hydrogen or $C_1$ to $C_{22}$ alkyl; $R^{32}$ is independently a $C_1$-$C_{10}$ alkyl, —O—, an amide group —C(O)N($R^6$)—, a polyether group —O(EO)$_a$(PO)$_b$—, —$R^{37}$-D-$R^{37}$—, or -D-$R^{37}$-D-, wherein $R^{37}$ is independently a $C_1$-$C_6$ alkyl and D is —O—, —S—, an amide group —C(O)N($R^{36}$)—, or an amino group —N($R^{36}$)—, wherein $R^{36}$, a and b are as defined above, and t is independently 0 or 1.

Z is $^{independently}$ hydrogen, —SO$_3$Y, —P(O)(OY)$_2$, —COOY, —CH$_2$COOY, —CH$_2$CH(OH)CH$_2$SO$_3$Y and when $R^{32}$ is not a polyether, Z is also —OSO$_3$Y, and —OP(O)(OY)$_2$; wherein Y is hydrogen, alkali metal such as sodium and potassium; alkaline earth metal such as magnesium and calcium; ammonium; or organic base salt such as monoethanolamine, diethanolamine, triethanolamine, triethylamine, trimethylamine, N-hydroxyethyl morpholine, and the like.

A1 or A2 is independently a straight chain or branched $C_1$ to $C_6$ alkyl, an O—$R^5$—O— group or aryl; preferably phenyl; $R^{33}$ is a bond, an aryl group such as a phenyl or diphenyl group, a $C_1$ to $C_{10}$ alkyl group, preferably a $C_1$ to $C_4$ alkyl group, most preferably methylene, —C≡C—, —O—, —S—, —N($R^{36}$)—, —$R^{35}$O—, —$R^{35}$O(EO)$_a$(PO)$_b$—, -D1$R^{38}$-D1- or —$R^{38}$-D1-$R^{38}$—, wherein $R^{38}$ is independently a $C_1$-$C_{10}$ alkyl group, —C(O)—, —$R^{35}$O (EO)$_a$(PO)$_b$—, —O—$R^{35}$—O—, or aryl, e.g. phenyl, and D1 is independently —O—, —S—, —S—, —SO$_2$—, —C(O)—, a polyether group —O(EO)$_a$(PO)$_b$—, an amide group —C(O)N($R^{36}$)—, an amino group —N($R^{36}$)—, —O—$R^5$—O—, or aryl wherein $R^{35}$, $R^{36}$, a and b are as defined above.

On the formulae of this disclosure, the term "alkali" includes substituted alkali, especially the hydroxy substituted derivatives thereof and straight as well as branched chains. When Z is hydrogen, the gemini surfactants are nonionic.

Other Gemini surfactants specifically useful in the present disclosure include gemini anionic or nonionic surfactants of the formulae:

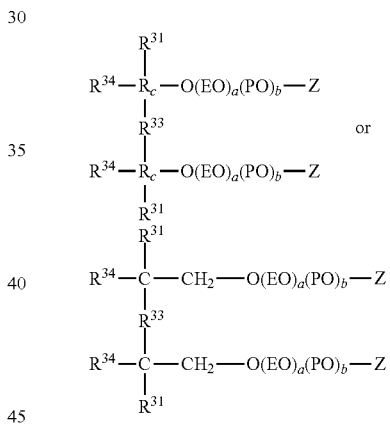

wherein $R_c$ represents aryl, preferably phenyl. $R^{31}$, $R^{33}$, $R^{34}$, and Z are as defined above. a and b are numbers of from 0 to 100, a is preferably from about 0 to about 30 and b is preferably from about 0 to 10, wherein the sum of a and b is at least one, and the EO and PO radicals can be randomly mixed or in discrete blocks.

The primary hydroxyl group of these surfactants can be readily phosphated, sulfated or carboxylated by standard techniques.

Alternatively, the detergent composition or cleaning composition disclosed herein can free of a Gemini surfactant.

Additional Components

The cleaning composition or detergent composition disclosed herein may also include one or more additional cleaning composition agents. Exemplary additional cleaning composition agents include, but are not limited to, a threshold agent; crystal modifier; hardening agent; bleaching agent; peroxycarboxylic acid, peroxycarboxylic acid composition, filler; defoaming agent; anti-redeposition agent; stabilizing agent; dispersant; fragrance and dye; and thickener.

Alternatively, the cleaning composition or detergent composition disclosed herein can be free of one, more, or all the additional cleaning composition agents.

Preparation of Compositions Herein

In one example, a compound of formula 1 is combined with any additional functional components and allowed to interact and harden into solid form. The solidification process may last from a few minutes to about six hours, depending on factors including, but not limited to: the size of the formed or cast composition, the ingredients of the composition, and the temperature of the composition.

The solid compositions may be formed using a batch or continuous mixing system. In an exemplary embodiment, a single- or twin-screw extruder is used to combine and mix one or more cleaning agents at high shear to form a homogeneous mixture. In some embodiments, the processing temperature is at or below the melting temperature of the components. The processed mixture may be dispensed from the mixer by forming, casting or other suitable means, whereupon the composition hardens to a solid form. The structure of the matrix may be characterized according to its hardness, melting point, material distribution, crystal structure, and other like properties according to known methods in the art. Generally, a solid composition processed according to the method of the disclosure is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in from approximately 1 minute to approximately 3 hours. Particularly, the formed composition begins to harden to a solid form from approximately 1 minute to approximately 2 hours. More particularly, the formed composition begins to harden to a solid form from approximately 1 minute to approximately 20 minutes.

In a casting process, the liquid and solid components are introduced into the final mixing system and are continuously mixed until the components form a substantially homogeneous liquid mixture in which the components are distributed throughout its mass. For example, the components can be mixed in the mixing system for at least approximately 60 seconds. Once the mixing is complete, the product is transferred to a packaging container where solidification takes place. In an exemplary embodiment, the cast composition begins to harden to a solid form in from approximately 1 minute to approximately 3 hours. Particularly, the cast composition begins to harden to a solid form in from approximately 1 minute to approximately 2 hours. More particularly, the cast composition begins to harden to a solid form approximately 1 minute to approximately 20 minutes.

By the term "solid", it is meant that the hardened composition will not flow and will substantially retain its shape under moderate stress or pressure or mere gravity. The degree of hardness of the solid cast composition may range from that of a fused solid product which is relatively dense and hard, for example, like concrete, to a consistency characterized as being a hardened paste. In addition, the term "solid" refers to the state of the composition under the expected conditions of storage and use of the solid composition. In general, it is expected that the composition will remain in solid form when exposed to temperatures of up to approximately 100° F. and particularly up to approximately 120° F.

The resulting solid composition may take forms including, but not limited to: a cast solid product; an extruded, pressed, molded or formed solid pellet, block, tablet, powder, granule, flake; or the formed solid can thereafter be ground or formed into a powder, granule, or flake. For example, extruded pellet materials formed by the solidification matrix can have a weight of about 50 grams to about 250 grams, extruded solids formed by the composition can have a weight greater than or equal to about 100 grams, and solid block cleaning compositions formed by the composition can have a mass of about 1 to about 10 kilograms. The solid compositions provide for a stabilized source of functional materials. In some embodiments, the solid composition may be dissolved, for example, in an aqueous or other medium, to create a concentrated and/or use composition. The solution may be directed to a storage reservoir for later use and/or dilution, or may be applied directly to a point of use.

The solid composition can be provided in the form of a unit dose. A unit dose refers to a solid composition unit sized so that the entire unit is used during a single washing cycle. When the solid composition is provided as a unit dose, it is typically provided as a cast solid, an extruded pellet, or a tablet having a size of approximately 1 gram to approximately 50 grams.

The solid composition can also be provided in the form of a multiple-use solid, such as a block or a plurality of pellets, and can be repeatedly used to generate aqueous compositions for multiple washing cycles. For example, the solid composition can be provided as a cast solid, an extruded block, or a tablet having a mass of about 5 grams to about 10 kilograms, from about 1 kilogram to about 10 kilograms, or from about 5 kilograms to about 8 kilograms. Alternatively, a multiple-use form of the solid composition can have a mass of about 5 grams to about 1 kilogram or about 5 grams to about 500 grams.

Although the composition is discussed as being formed into a solid product, the composition may also be provided in the form of a paste or liquid. When the concentrate is provided in the form of a paste, enough water is added to the composition such that complete solidification of the composition is precluded. In addition, dispersants and other components may be incorporated into the composition in order to maintain a desired distribution of components.

When used in the methods described herein below, the cleaning compositions or detergent compositions may be ready to use solutions or concentrate compositions which may be added to an aqueous system or may be diluted to form use compositions. In general, a concentrate refers to a composition that is intended to be added to or diluted with water, and the composition that contacts articles to be washed can be referred to as the use composition.

A use composition may be prepared from the concentrate by diluting the concentrate with water at a dilution ratio that provides a use composition having desired detersive properties. The water that is used to dilute the concentrate to form the use composition can be referred to as water of dilution, or a diluent, and can vary from one location to another. The use composition can also include additional functional ingredients at a level suitable for cleaning, rinsing, or the like.

The concentrate compositions may essentially include only a compound or compounds of formula 1, and additional components and/or functional materials may be added as separate ingredients prior to the point of use or at the point of use. Alternatively, the concentrate compositions may include a compound or compounds of formula 1 as well as additional components such as, but not limited to, at least one alkali metal hydroxide.

The typical dilution factor for the cleaning composition or detergent composition is from approximately 1 to approximately 10,000 but will depend on factors including water hardness, the amount of soil to be removed and the like. For example, the concentrate is diluted at a ratio of about 1:10 to about 1:1000 concentrate to water. Particularly, the concentrate is diluted at a ratio of about 1:100 to about 1:5000 concentrate to water. More particularly, the concentrate is diluted at a ratio of about 1:250 to about 1:2000 concentrate to water.

For the purpose of illustration, representative non-limiting cleaning or detergent compositions comprising the compound of Formula 1, 2 or 3 that are useful for various applications are provided herein.

The membrane may be contacted with from about 10 to about 5,000 ppm of the compound of Formula 1, 2, or 3, based on the total weight of the fluid contacting the membrane.

In the methods disclosed herein, the membrane can be a membrane used in a dairy process. For example, the membrane can be a microfiltration membrane, an ultrafiltration membrane, a nanofiltration membrane, a reverse osmosis membrane or a combination thereof.

Definitions

As used herein, the term "substantially free", "free" or "free of" refers to compositions completely lacking the component or having such a small amount of the component that the component does not affect the performance of the composition. The component may be present as an impurity or as a contaminant and shall be less than 0.5 wt. %. For

| Hard Surface Cleaner/Degreaser pH ≥ 2 | Dishwashing/ Warewashing Detergent pH ≥ 5 | Laundry Detergent pH ≥ 5 | Manual Pot and Pan Presoak pH ≥ 5 | Clean-in-Place Formulation pH ≥ 1 |
|---|---|---|---|---|
| Compound of Formula 1, 2 or 3 | Compound of Formula 1, 2 or 3 | Compound of Formula 1, 2 or 3 | Compound of Formula 1, 2 or 3 | Compound of Formula 1, 2 or 3 |
| Surfactant | Alkalinity Source | Alkalinity Source | Alkalinity Source | Alkalinity Source OR |
| Alkalinity Source | Surfactant | Surfactant | Surfactant | Organic or Inorganic Acid |
| Organic or Inorganic Acid | Water conditioning agents | Water conditioning agents | Surfactant | Surfactant |
| Water conditioning agents | Enzyme | Enzyme | Water conditioning agents | Water conditioning agents |
| Solvent | Oxidizer | Oxidizer | Enzyme | Enzyme |
| Water | Water | Water | Water | Water |
| Adjuvant ingredients | Adjuvant ingredients | Optical Brightener Adjuvant ingredients | Adjuvant ingredients | Adjuvant ingredients |

Methods of cleaning an article are also provided. The methods comprise contacting the article with a detergent composition comprising a compound of Formula 1, 2, or 3 as described herein. As described above, the detergent composition can further comprise a building agent. The building agent can comprise an enzyme, an oxidizing agent, a condensed phosphate, an alkali metal carbonate, an alkali metal silicate, an alkali metal metasilicate, a phosphonate, an amino carboxylic acid, a carboxylic acid polymer, or a combination thereof.

The article can be contacted with from about 50 to about 6,000 ppm of the cleaning composition based on the total volume of the fluid in contact with the article.

The article can be contacted with from about 10 to about 3,000 ppm of the compound of Formula 1, 2, or 3 based on the total volume of the fluid in contact with the article.

The article can comprise a metal surface, a glass surface, a fabric, a ware, a polycarbonate surface, a polysulfone surface, a melamine surface, a ceramic surface, a porcelain surface, or a combination thereof. Preferably, the article is a fabric. More preferably, the article is a ware.

Also provided are methods for cleaning a membrane. The methods comprise contacting the membrane with a cleaning solution comprising any compound of Formula 1, 2, or 3 as described herein.

example, the amount of the component can less than 0.1 wt. % or, in some cases, the amount of component can be less than 0.01 wt. %.

The term "weight percent", "wt. %", "percent by weight", "% by weight", and variations thereof, as used herein, refer to the concentration of a substance as the weight of that substance divided by the total weight of the composition and multiplied by 100. It is understood that, as used here, "percent", "%", and the like are intended to be synonymous with "weight percent", "wt. %", etc.

As used herein, the term "polymer" means a water-soluble or water-dispersible polymer. The term "polymer" encompasses and includes homopolymers, copolymers, terpolymers and polymers with more than three monomers, cross-linked or partially crosslinked polymers, and combinations or blends of these.

As used herein, the term "polymer solution" or "polymer dispersion" means a polymer composition substantially dispersed or dissolved in water, a water source, or a water-based solution. Water-based solutions include one or more dissolved salts, buffers, acids, bases, surfactants, or other dissolved, dispersed, or emulsified compounds, materials, components, or combinations thereof.

As used herein, "inverse emulsion polymer" and "inverse latex polymer" mean a water-in-oil polymer emulsion comprising a water-soluble polymer (which could be cationic, anionic, nonionic, amphoteric polymer, or zwitterionic) in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and generally another surfactant. See U.S. Pat. No. 3,734,873, incorporated herein by reference.

As used herein, the term "water source" means a source of water comprising, consisting essentially of, or consisting of fresh water, deionized water, distilled water, produced water, municipal water, waste water such as runoff water or municipal waste water, treated or partially treated waste water, well water, brackish water, "gray water", sea water, or a combination of two or more such water sources as determined by context. A water source can include one or more salts, ions, buffers, acids, bases, surfactants, or other dissolved, dispersed, or emulsified compounds, materials, components, or combinations thereof.

As used herein, the term "oil" or "hydrocarbon solvent" as applied to an oil phase of a water-in-oil emulsion, means any compound or blend thereof that is less than 0.1 wt % soluble in water at 25° C., is substantially chemically inert within a water-in-oil emulsion as described herein, and is a liquid over at least the range of 20° C. to 100° C.

As used herein, the term "water phase" means a water source having at least a monomer or polymer dispersed or dissolved therein, further wherein the dispersion or solution is a discontinuous phase within a water-in-oil emulsion.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, -n-pentyl, i-pentyl, s-pentyl, t-pentyl, and the like.

The terms "aryl" or "ar" as used herein alone or as part of another group (e.g., arylalkyl) denote optionally substituted homocyclic aromatic groups, preferably monocyclic or bicyclic groups containing form 6 to 12 carbon atoms in the ring portion, such as phenyl, biphenyl, naphthyl, substituted phenyl, substituted biphenyl, or substituted naphthyl. Phenyl and substituted phenyl are the more preferred aryl groups. The term "aryl" also includes heteroaryl functional groups.

"Arylalkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

The term "substituted," as in "substituted aryl," "substituted alkyl," and the like, means that in the group in question (i.e., the alkyl, aryl, or other group that follows the term), at least one hydrogen atom bound to a carbon atom is replaced with one or more substituent groups such as hydroxy (—OH), alkylthio, amido (—CON($R_A$)($R_B$), wherein $R_A$ and $R_B$ are independently hydrogen, alkyl, or aryl), amino (—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

The term "heterocyclo," "heterocycle," or "heterocyclyl," as used herein, refers to a monocyclic, bicyclic, or tricyclic group containing 1 to 4 heteroatoms selected from N, O, S(O)n, P(O)n, PRz, NH or NRz, wherein Rz is a suitable substituent. Heterocyclic groups optionally contain one or two double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2 yl, tetrahydrofuran-3-yl, imidazolidin-1-yl, imidazolidin-2 yl, imidazolidin-4-yl, pyrrolidin-1-yl, pyrrolidin-2 yl, pyrrolidin-3-yl, piperidin-1-yl, piperidin-2 yl, piperidin-3-yl, piperazin-1-yl, piperazin-2 yl, piperazin-3-yl, 1,3-oxazolidin-3-yl, isothiazolidine, 1,3-thiazolidin-3-yl, 1,2 pyrazolidin-2 yl, 1,3-pyrazolidin-1-yl, thiomorpholin-yl, 1,2 tetrahydrothiazin-2 yl, 1,3-tetrahydrothiazin-3-yl, tetrahydrothiadiazin-yl, morpholin-yl, 1,2 tetrahydrodiazin-2 yl, 1,3-tetrahydrodiazin-1-yl, 1,4-oxazin-2 yl, and 1,2,5 oxathiazin-4-yl. Heterocyclic groups can be unsubstituted or substituted by one or more suitable substituents, preferably 1 to 3 suitable substituents, as defined above.

Having described the disclosure in detail, it will be apparent that modifications and variations are possible without departing from the scope of the disclosure and/or defined in the appended claims.

EXAMPLES

The following non-limiting examples are provided to further illustrate the present disclosure.

Example 1

Synthesis of Novel Surfactant Compositions

The overall synthesis of the surfactants described herein is achieved in two steps (Scheme 1). Acceptor molecule (C) is first prepared by ring opening reaction of an alkyl-epoxide (II) with an aromatic amine or alcohol compound (A). The second step involves oxyalkylation of the acceptor molecule (C) with alkylene oxide (D) to afford a series of surfactants (E).

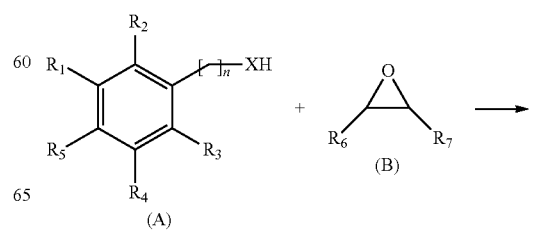

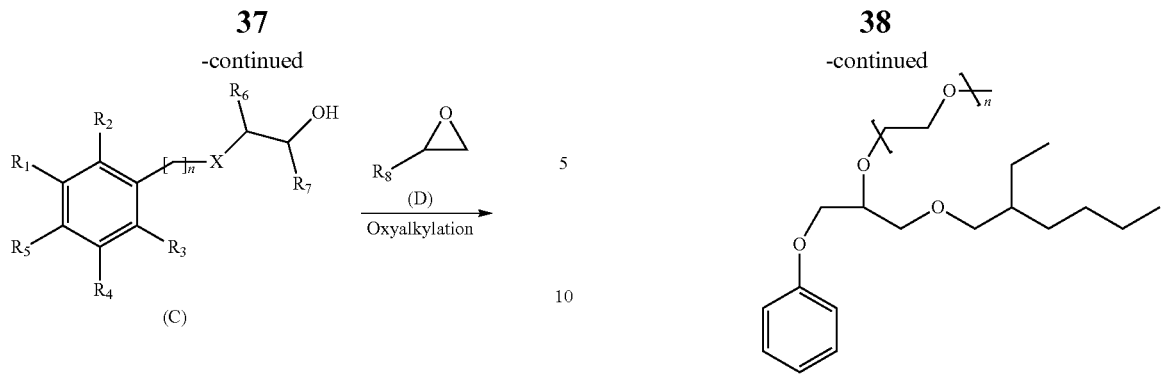

wherein X, $R_1$, $R_2$, $R_3$, $R_4$, $R_5$, $R_6$, $R_7$, $R_8$, m, and n are defined above.

Examples 1 and 2 disclose the specific synthesis of a series of ethoxylated 1-((2-ethylhexyl)oxy-3-phenoxypropan-2-ol via the following two step process (Scheme 2):

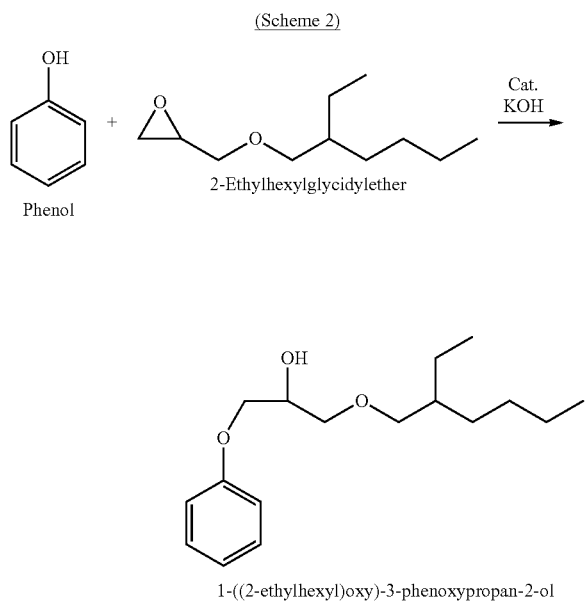

Example 1A

Synthesis of 1-((2-ethylhexyl)oxy)-3-phenoxypropan-2-ol

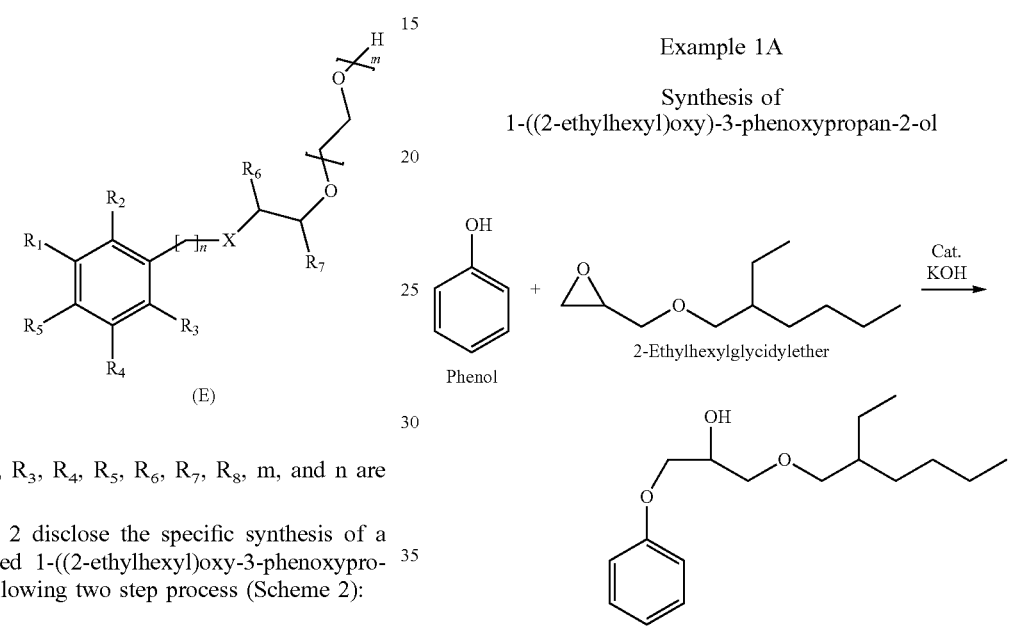

TABLE 1

| Reagent | MW(g/mol) | Mass(g) | n(mole) |
|---|---|---|---|
| Phenol | 94.11 | 100 | 1.06 |
| 2-Ethylhexyl glycidyl ether | 186.29 | 200 | 1.06 |
| KOH Pallets | 56.11 | 1 | 0.02 |

Phenol (100 g, 1.06 mole) and potassium hydroxide (1 g, 0.02 mole) were added to a 500 mL three necked round-bottom flask equipped with temperature probe, condenser, nitrogen inlet and magnetic stir bar and the temperature of the reaction increased to 50° C. 2-Ethylhexylglycidal ether (200 g, 1.06 moles) was then added to the molten phenol under nitrogen blanket. The temperature of the reaction was further increased to 130° C. and stirred for 4 hours or until completion of reaction. The progress of the reaction was monitored by GC-MS (FIG. 1). The structure of the resulting compound was confirmed by NMR (FIG. 2) and mass spectrometry (+ESI-MS): calc. [M+H]+ 281.21. found 281.2109.

Example 1B

Addition of Ethylene oxide to the 1-((2-ethylhexyl)oxy)-3-phenoxypropan-2-ol

After catalyzing and dehydrating, 505.93 g of 1-((2-ethylhexyl)oxy-3-phenoxypropan-2-ol was charged to a 2-liter Parr reactor and heated to 125° C. under 10 psi of nitrogen at a stirrer speed of 300 rpm. The ethoxylation reaction was initiated when the acceptor material reached 125° C. The ethylene oxide was charged in step-wise fashion to slowly increase the working pressure range of 55-65 psi during the oxide feed. A slight exotherm was observed. Once the target amount of ethylene oxide, 476.5 g (6 mol), was charged to the reactor, the oxide feed was discontinued and the reaction was allowed to proceed for 6 hours at 125° C. The material was then cooled and sampled for testing. Preparation of intermediates with increasing levels of ethylene oxide (6-13 mol EO) was completed through addition of the desired amounts of EO.

Example 2A

Synthesis of 3,3'-((4-hydroxyphenyl)azanediyl)bis(1-((2-ethylhexyl)oxy)propan-2-ol)

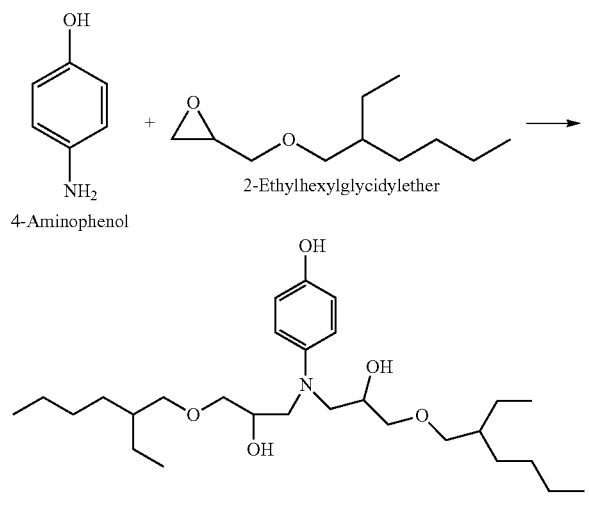

TABLE 2

| Reagent | MW(g/mol) | Mass(g) | n(mole) |
| --- | --- | --- | --- |
| 4-Aminophenol | 109.13 | 176 | 1.612 |
| 2-ethylhexylglycidyl ether | 186.29 | 600 | 3.22 |

To a 1 L three necked round-bottom flask equipped with temperature probe, nitrogen inlet, condenser and magnetic stir bar was added 2-ethylhexylglycidal ether (600 g, 3.22 moles). 4-Aminophenol (176 g, 1.612 mole) was then added to the well-stirred reaction mixture. The resulting suspension was heated to 120° C. under a nitrogen blanket and stirred for 3 hours or until the reaction was completed. As the reaction proceeded to completion, the suspension turned into a homogenous dark-amber product. The resulting product was characterized by NMR and ESI-MS.

Example 2B

Addition of Ethylene oxide to the 3,3'-((4-hydroxyphenyl)azanediyl)bis(1-((2-ethylhexyl)oxy)propan-2-ol)

After catalyzing and dehydrating, 481.72 g of 3,3'-((4-hydroxyphenyl)azanediyl)bis(1-((2-ethylhexyl)oxy)propan-2-ol) was charged to a 2-liter Parr reactor and heated to 125° C. under 10 psi of nitrogen at a stirrer speed of 300 rpm. The ethoxylation reaction was initiated when the acceptor material reached 125° C. The ethylene oxide was charged in step-wise fashion to slowly increase the working pressure range of 55-65 psi during the oxide feed. A slight exotherm was observed. Once the target amount of ethylene oxide, 440.5 g (10 mol), was charged to the reactor, the oxide feed was discontinued and the reaction was allowed to proceed for 6 hours at 125° C. The material was then cooled and sampled for testing. Preparation of intermediates with increasing levels of ethylene oxide (10-24 mol O-EO) was completed through addition of the desired amounts of EO.

Example 3

Physical Properties of 1-((2-ethylhexyl)oxy)-3-phenoxypropan-2-ol ethoxylate

In this example, the interfacial tension, cloud point and critical micelle concentration was determined for a series of ethoxylate surfactants (1-((2-ethylhexyl)oxy)-3-phenoxypropan-2-ol ethoxylate) having 6 to 13 moles of EO groups.

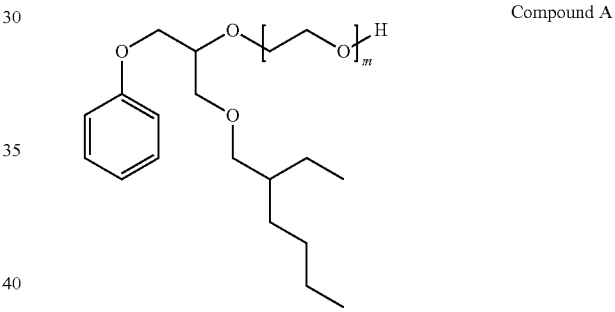

Compound A

| 1-((2-ethylhexyl)oxy)-3-phenoxypropan-2-ol ethoxylate (Compound A) | mEO, where m indicates moles of EO units | Surfactants (Prepared as in Examples 1A and 1B) |
| --- | --- | --- |

The interfacial tension is a surface free energy of the interface between two immiscible liquids (in this case, oil and water). Addition of surfactants reduces the interfacial tension. To achieve low interfacial tension, the surfactant partitions equally between two phases and the surfactant has a low affinity for both phases.

The interfacial tension between aqueous surfactant solution at 1% and corn oil was measured using a spinning drop Tensiometer at 4000 rpm. The temperature was kept constant at 25° C. This value is actually dependent on temperature. The minimum interfacial value of different surfactants can be different depending on the temperature and oil phase chosen.

The interphase tension for the ethoxylate surfactants measured using corn oil or dodecane as the light phase are described in Table 3.

TABLE 3

Interphase tension

| Surfactant ID | Interfacial tension (mN/m) (25° C., light phase = corn oil, 4000 rpm) | Interfacial tension (mN/m) (25° C., light phase = dodecane, 4000 rpm) |
|---|---|---|
| 6EO | 0.49 | 0.13 |
| 7EO | 0.35 | 0.10 |
| 8EO | 0.57 | 0.25 |
| 9EO | 0.68 | 0.40 |
| 10EO | 0.84 | 0.56 |
| 11EO | 1.07 | 0.89 |
| 12EO | 1.26 | 1.03 |
| 13EO | 1.63 | 1.65 |
| NPE 9.5 | 0.837 | 0.40 |

The cloud point is the temperature at which the solution of a nonionic surfactant turns cloudy. At this point, the solution has crossed a phase boundary and the cloudy solution is an emulsion of a coacervate phase in a dilute phase.

The surfactant solution at 1 wt. % was heated slowly with stirring to ensure consistent temperature throughout. The temperature at which the solution started to turn cloudy was taken as a cloud point and depicted in Table 4 for the series of ethoxylate surfactants.

TABLE 4

Cloud points

| Surfactant ID | Cloud Point (° C.) (+/−1° C.) |
|---|---|
| 6EO | <1 |
| 7EO | 1.0 |
| 8EO | 12.5 |
| 9EO | 27.0 |
| 10EO | 37.5 |
| 11EO | 48.0 |
| 12EO | 58.5 |
| 13EO | 77.5 |
| NP9.5 | 53.0 |

The critical micelle concentration (CMC) is a concentration at which a micelle starts to form in a solution having a surfactant. It can be measured through several physical property measurements. Here, it was determined by measuring the surface tension of a surfactant solution at various concentrations. A semi log plot of concentration-surface temperature yielded a curve with a break or change in slope. At the break, the concentration was taken as the critical micelle concentration (CMC). Table 5 summarizes the critical micelle concentration for each of the ethoxylate surfactants tested.

TABLE 5

Critical Micelle Concentrations

| Surfactant ID | CMC (ppm) |
|---|---|
| 6EO | 72.45 |
| 7EO | 110.84 |
| 8EO | 129.02 |
| 9EO | 152.75 |
| 10EO | 167.80 |
| 11EO | 227.52 |
| 12EO | 350.73 |
| 13EO | 451.00 |

Example 4

Surfactants Effective at Butterfat Removal

A standard butterfat removal test method was used to screen surfactants for their ability to remove butter from a polysulfone coupon. Typical consumer materials are made of PES (polyethersulfone) or PVDF material. Here, a polysulfone coupon was used to represent the PES membrane surface.

Ethoxylated surfactants, Compound A (9EO and 10EO), were tested alongside deionized (DI) water, Ethyl hexyl alcohol alkoxylate (Ecosurf EH-9), Nonylphenol with 9.5 moles of ethylene oxide (NPE 9.5) and lauramine oxide (Barlox 12). Each surfactant was used at a concentration of 200 or 600 ppm except EH-9 (always 1000 ppm).

Brand new, unused, coupons (1×3 in. PS coupons from Small Parts via Amazon) were used for each surfactant tested. Each coupon was soaked in methanol for 30 seconds and allowed to dry, then placed on a cookie sheet (lined with Wypall towels) in a 120° F. oven for 30 minutes. After cleaning and drying, each coupon was weighed on an analytical balance. Then a homogenous layer of room temperature butter (unsalted) was applied to the bottom 75% of each coupon using a 1" wide foam brush. Overall, about 0.0250 to 0.0300 g of butter was applied to each coupon. Then the coupons were placed back on the cookie sheet and allowed to dry overnight before weighing a second time.

600 g of a test solution consisting of each of Compound A-9EO, Compound A-10EO, NPE 9.5, Barlox 12 (200 or 600 ppm, except for EH-9 (always 1000 ppm)) in DI water was prepared and added to a beaker along with a stir bar. The solution was heated to 45° C., stir speed was set to 240 rpm, and either tested at pH 7, pH 9, or pH 11. Note, each surfactant was tested in quadruplicate using four different coupons in one beaker containing the relevant surfactant solution. Once prepared, the coupons were suspended in the solution at a constant distance between the coupon and the center of the beaker, with the soiled/butter side faced the center. The stir speed was maintained at 240 rpm and the temperature maintained at 45° C. for 10 minutes. Then each coupon was removed and dipped three times into a separate beaker slowly overflowing with DI water (e.g., placed under a running DI faucet). Each "dip" consisted of submerging the coupon under the water for 2 seconds and removing for 2 seconds. The coupons were then placed on a paper towel to dry before returning to the cookie sheet where they dried overnight. The next day, they were weighed again.

FIG. 1 shows the percent soil removal calculated from the weight of the cleaned coupons compared to the dried soiled coupons for Compound A-9EO, Compound A-10EO, NPE 9.5, and EH9 at pH 7 9, and 11.

Figure 2:
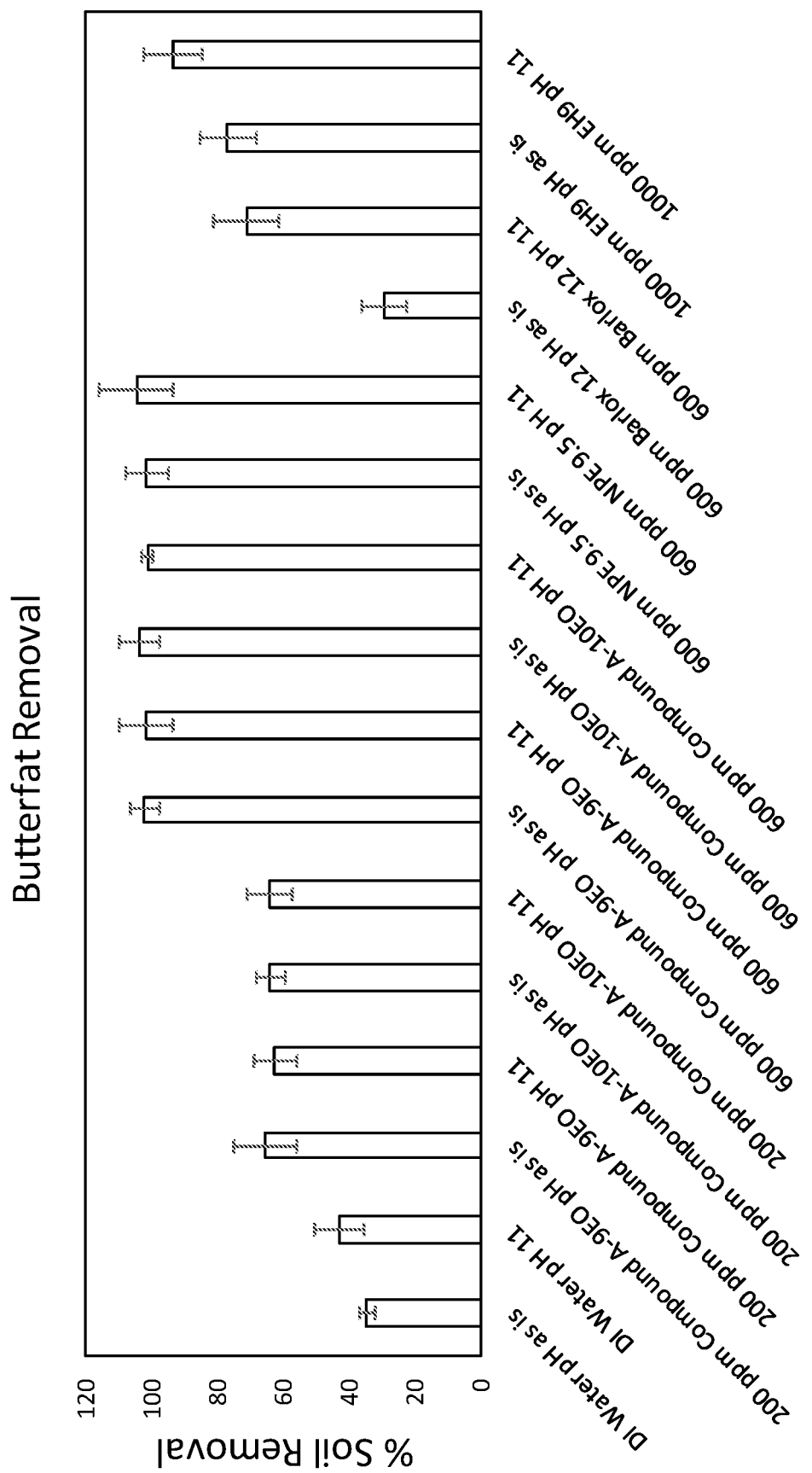
FIG. 2 shows the percent butterfat removal calculated from the weight of the cleaned coupons compared to the dried soiled coupons for Compound A-9EO, Compound A-10EO, NPE 9.5, Barlox 12, and EH9 either without pH adjust or with pH adjusted to 11 described in Example 4.

FIG. 2 shows the percent butterfat removal calculated from the weight of the cleaned coupons compared to the dried soiled coupons for Compound A-9EO, Compound A-10EO, NPE 9.5, Barlox 12, and EH9 either without pH adjust or with pH adjusted to 11.

Example 5

Non-APE Surfactants Demonstrate Good Soil Removal from Premade Fabric Swatches

In this example, an alkaline detergent builder alone or in combination with the novel surfactants disclosed herein were subjected to a standard Tergotometer test procedure to measure soil removal from premade fabric swatches (e.g., terry cotton). The test measured the ability of each detergent-surfactant combination to remove makeup from terry cotton. The tests were performed at 40° C.

Premade cotton swatches purchased from Test Fabrics, Inc. were stamped with make-up using a standardized method designed to reduce variability in lipstick application to allow for repeatable and consistent cleaning testing. Briefly, the stamping procedure involved: pouring the liquid makeup onto a watch glass and a rounded foam applicator was used to apply the makeup to the stamp. The applicator was gently dabbed over the entire surface of the stamp until the surface of the stamp was smooth. Then a clean edge, such as the edge of a stainless steel curtain, was dragged across the stamp with the direction of the ridges. Ideally, the stamp was fully coated in makeup with ridges remaining visible. The fabric swatches were stamped, using the same quantity of pressure for each swatch. The stamp was lifted lightly to allow the freshly stamped soil to be undisturbed.

Premade fluid make-up on cotton swatches (code #C-S-17) were purchased from the Center for Testmaterials B.V.

Soiled fabric swatches were then subjected to a standard tergotometer test to measure effectiveness of detergent/surfactant combinations at removing the soil. A tergotometer Model #7243ES, Serial MCC 14-813 from Test Fabrics Inc was used along with 1 L pots and a water bath. Before washing, the initial values of the soiled swatches were read on the Mach5 Colour Instrument to establish the initial "L" value. The tergotometer was set for 120° F. and 0.5 liter of 5 grain water added to each of the six pots and allowed to equilibrate to 120° F.

The laundry solutions were weighed out and added to the tergotometer pots and agitated for 30 seconds to 1 minutes to mix and dissolve. The controller was set for a 1 minute run time, with an RPM of 100 (standard RPM for most tests). Each swatch was added quickly in order to minimize differences in exposure time to the detergent systems. Each swatch was agitated for 10 minutes immediately after adding swatches and then removed and transferred to 1 L of cold 5 grain water to rinse. The swatches were then removed from the cold water and further rinsed under cold 5 grain tap water. Excess moisture was removed by squeezing and the swatches were air dried on a Wypall paper towel. After drying, the Mach5 Colour Instrument was used to measure the final "L" value. The % soil removal was calculated from the difference between the initial (before washing) L value and the final L value (after washing).

Figure 3A:
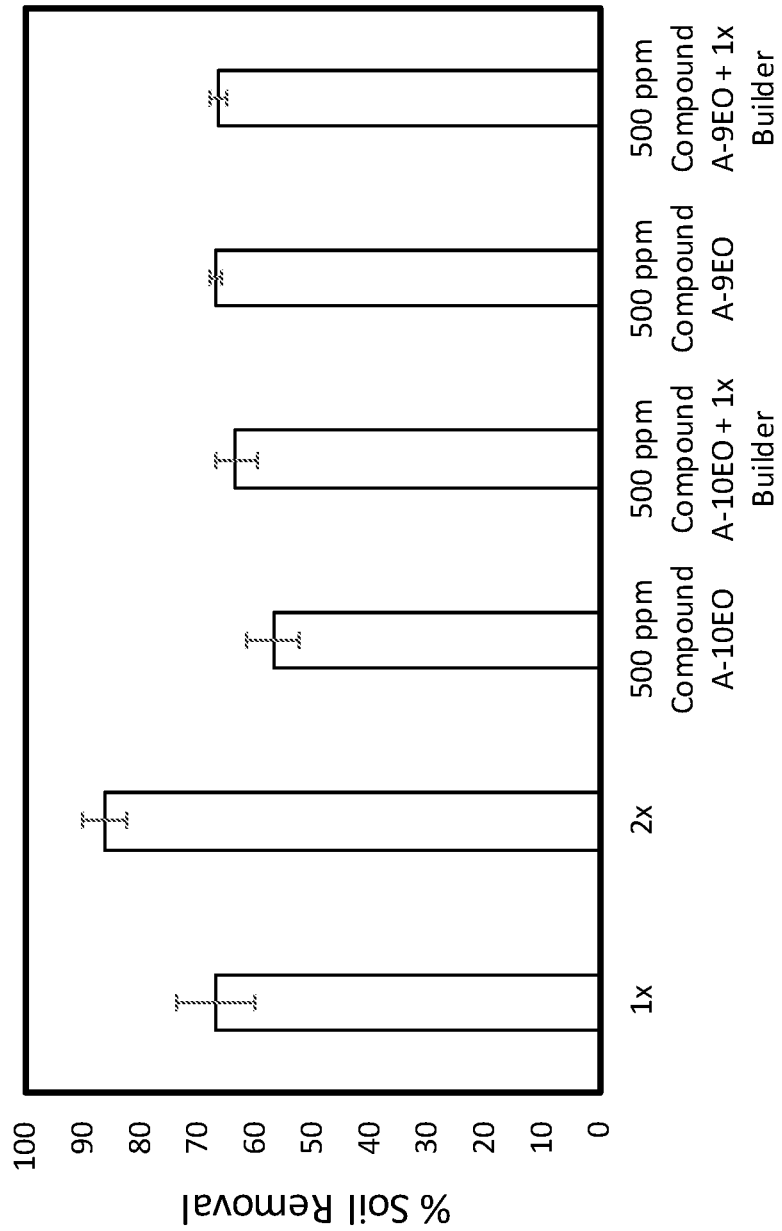
FIG. 3A shows the percent soil removal (soil from Loreal True Match Foundation in natural beige) determined by tergotometer for 500 ppm Aquanomic 2.0 Low Temperature Detergent and 600 ppm builder (1×), 1000 ppm Aquanomic 2.0 Low Temperature Detergent and 1200 ppm builder (2×), 500 ppm Compound A-10EO, 500 ppm Compound A-10EO plus 600 ppm builder, 500 ppm Compound A-9EO, and 500 ppm Compound A-9EO plus 600 ppm builder described in Example 5.

FIG. 3A shows the percent soil removal (soil from Loreal True Match Foundation in natural beige) determined by tergotometer for 500 ppm Aquanomic 2.0 Low Temperature Detergent and 600 ppm Aquanomic 2.0 Low Temperature Builder (1×), 1000 ppm Aquanomic 2.0 Low Temperature Detergent and 1200 ppm Aquanomic 2.0 Low Temperature Builder (2×), 500 ppm Compound A-10EO, 500 ppm Compound A-10EO plus 600 ppm Aquanomic 2.0 Low Temperature Builder, 500 ppm Compound A-9EO, and 500 ppm Compound A-9EO plus 600 ppm Aquanomic 2.0 Low Temperature Builder.

Figure 3B:
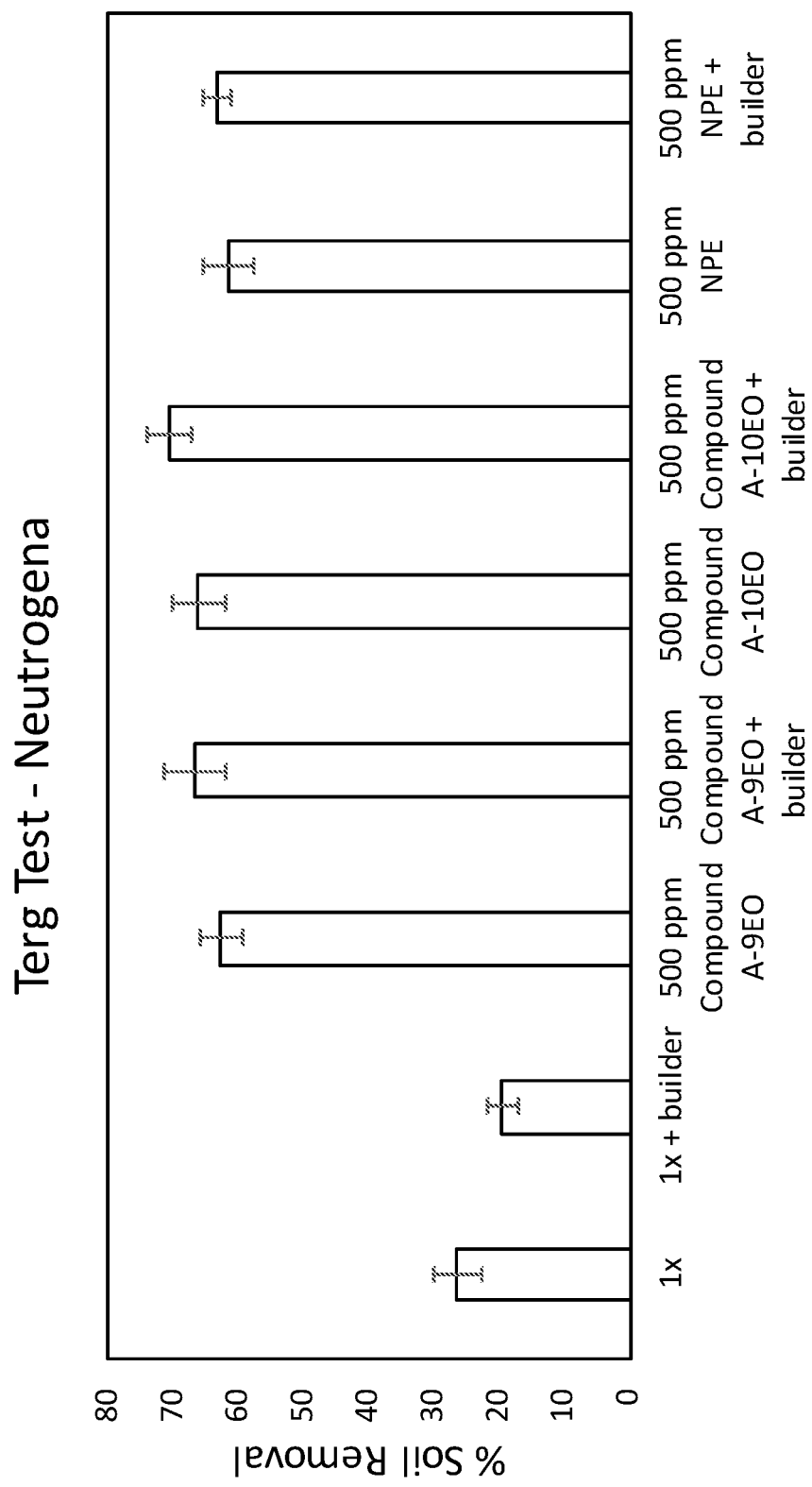
FIG. 3B shows the percent soil removal (soil from Neutrogena Healthy Skin Foundation in natural beige) determined by tergotometer for 500 ppm Aquanomic 2.0 Low Temperature Detergent (1×), 500 ppm Aquanomic 2.0 Low Temperature Detergent and 600 ppm Aquanomic 2.0 Low Temperature Builder (1×+builder), 500 ppm Compound A-9EO, and 500 ppm Compound A-9EO plus 600 ppm Aquanomic 2.0 Low Temperature Builder, 500 ppm Compound A-10EO, 500 ppm Compound A-10EO plus 600 ppm builder, 500 ppm NPE, 500 ppm NPE plus 600 ppm builder described in Example 5.

FIG. 3B shows the percent soil removal (soil from Neutrogena Healthy Skin Foundation in natural beige) determined by tergotometer for 500 ppm Aquanomic 2.0 Low Temperature Detergent (1×), 500 ppm Aquanomic 2.0 Low Temperature Detergent and 600 ppm Aquanomic 2.0 Low Temperature Builder (1×+builder), 500 ppm Compound A-9EO, and 500 ppm Compound A-9EO plus 600 ppm Aquanomic 2.0 Low Temperature Builder, 500 ppm Compound A-10EO, 500 ppm Compound A-10EO plus 600 ppm Aquanomic 2.0 Low Temperature Builder, 500 ppm NPE, 500 ppm NPE plus 600 ppm Aquanomic 2.0 Low Temperature Builder.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above compositions and processes without departing from the scope of the disclosure, it is intended that all matter contained in the above description and shown in the accompanying drawings shall be interpreted as illustrative and not in a limiting sense.

The invention claimed is:

1. A method for cleaning an article, the method comprising contacting the article with a cleaning composition comprising a compound of Formula 1 having the following structure:

wherein

A is an optionally substituted phenyl, naphthalene, indole, purine, pyridine, quinoline, isoquinoline or pyrimidine; and Z has a structure of moiety A or moiety B:

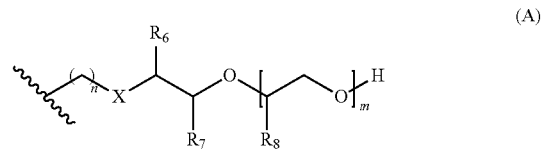

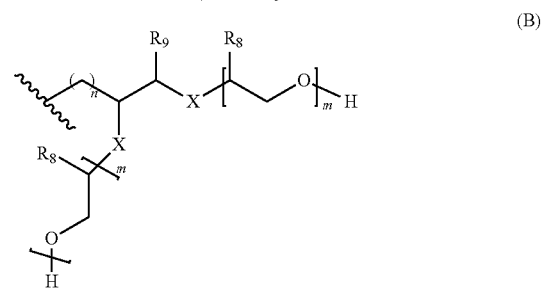

wherein
X is —O—, —N($R_{10}$)—, or —OC(O)—;
n is an integer from 0 to 10;
$R_6$ and $R_9$ are independently hydrogen, alkyl, or aryl;
$R_7$ is —(CH$_2$)z—O—$R_{11}$;
$R_8$ is independently hydrogen, alkyl, or aryl;
$R_{10}$ is hydrogen, alkyl, or Z;
$R_{11}$ is hydrogen or alkyl;
m is independently an integer from 3 to 20; and
z is an integer from 1 to 10;
and the cleaning composition has a pH of 7 or less.

2. The method of claim 1, wherein the cleaning composition has a pH of about 1 to 7.

3. The method of claim 1, wherein moiety B has the structure of moiety B1 or moiety B2:

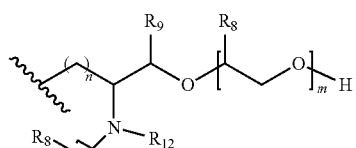
(B1)

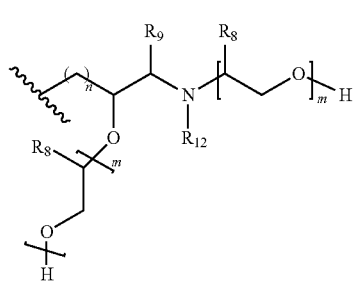
(B2)

wherein
  $R_9$ is independently hydrogen, alkyl, or aryl; and
  $R_{12}$ is independently $C_3$ to $C_{22}$ alkyl or alkenyl.

4. The method of claim 3, wherein A is an optionally substituted phenyl or naphthyl.

5. A method for cleaning an article, the method comprising contacting the article with a cleaning composition comprising a compound of Formula 2 having the following structure:

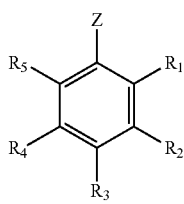
(2)

wherein
  $R_1$, $R_2$, $R_3$, $R_4$, and $R_5$ are independently hydrogen, Z, alkyl, alkoxyl, or two adjacent R groups combine to form a fused ring;
  Z has a structure of moiety A or moiety B:

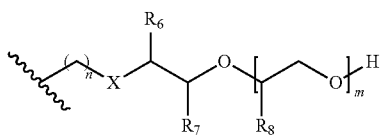
(A)

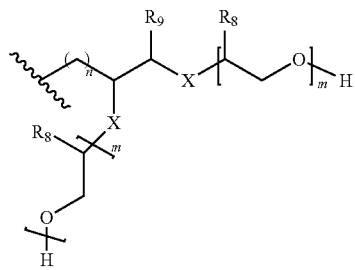
(B)

wherein
  X is —O—, —N($R_{10}$)—, or —OC(O)—;
  n is an integer from 0 to 10;
  $R_6$ and $R_9$ are independently hydrogen, alkyl, or aryl;
  $R_7$ is —($CH_2$)z-O—$R_{11}$;
  $R_8$ is independently hydrogen, alkyl, or aryl;
  $R_{10}$ is hydrogen, alkyl, or Z;
  $R_{11}$ is hydrogen or alkyl;
  m is an integer from 3 to 20; and
  z is an integer from 1 to 10;
  and the cleaning composition has a pH of 7 or less.

6. The method of claim 5, wherein the cleaning composition has a pH of about 1 to 7.

7. The method of claim 5, wherein moiety B has the structure of moiety B1 or moiety B2:

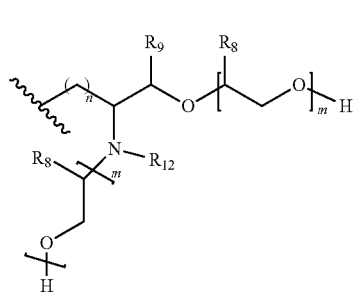
(B1)

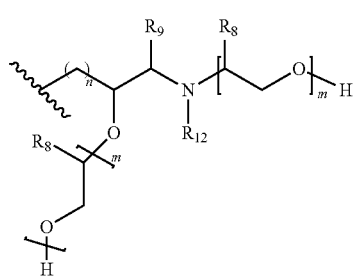
(B2)

wherein
  $R_9$ is independently hydrogen, alkyl, or aryl; and
  $R_{12}$ is independently $C_3$ to $C_{22}$ alkyl or alkenyl.

8. The method of claim 5, wherein at least one of $R_1$, $R_2$, $R_3$, $R_4$, and $R_5$ is Z.

9. The method of claim 8, wherein the compound has the structure of Formula 3:

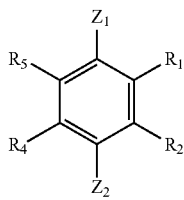
(3)

wherein $R_1$, $R_2$, $R_4$, and $R_5$ are independently hydrogen, alkyl, alkoxyl, or Z; and
$Z_1$, $Z_2$, and Z independently have a structure of moiety A or moiety B:

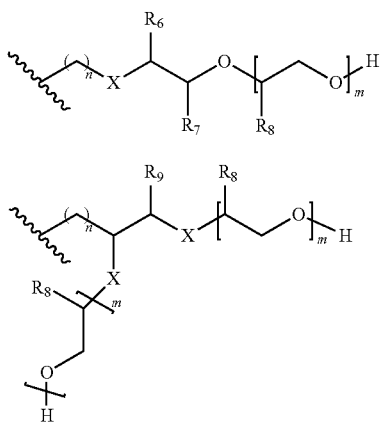

(A)

(B)

wherein
X is —O— or —N($R_{10}$)—;
n is an integer from 0 to 5;
$R_6$ and $R_9$ are independently hydrogen or alkyl;
$R_7$ is —(CH$_2$)z-O—$R_{11}$,
$R_8$ is independently hydrogen, alkyl, or aryl;
$R_{10}$ is hydrogen, alkyl, or Z;
$R_{11}$ is hydrogen or alkyl;
m is an integer from 3 to 20;
z is an integer from 1 to 10.

10. The method of claim 9, wherein $R_1$, $R_2$, $R_3$, $R_4$, and $R_5$ are hydrogen.

11. The method of claim 9, wherein $R_6$ and $R_9$ are hydrogen.

12. The method of claim 9, wherein $R_8$ is hydrogen or methyl.

13. The method of claim 9, wherein z is 1 to 3 and $R_{11}$ is $C_4$ to $C_{22}$ alkyl.

14. The method of claim 1, wherein the compound of Formula 1 has a structure corresponding to

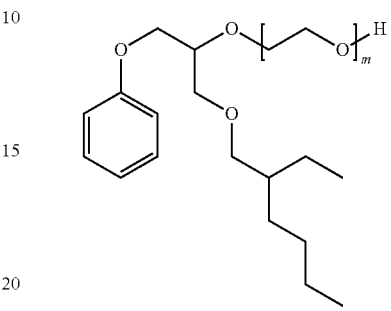

wherein m is an integer from 6 to 12.

15. The method of claim 14, wherein m is 9 or 10.

16. The method of claim 9, wherein the article is a metal surface, a glass surface, a fabric, a ware, a polycarbonate surface, a polysulfone surface, a melamine surface, a ceramic surface, a porcelain surface, a membrane, or a combination thereof.

17. The method of claim 9, wherein the cleaning composition further comprises a building agent and the building agent is an enzyme, an oxidizing agent, a condensed phosphate, an alkali metal silicate, an alkali metal metasilicate, a phosphonate, an amino carboxylic acid, a carboxylic acid polymer, or a combination thereof.

18. The method of claim 16, wherein the article is a fabric or a ware.

19. The method of claim 16, wherein the article is a membrane and the membrane is a membrane used in a dairy process and further the membrane is a microfiltration membrane, an ultrafiltration membrane, a nanofiltration membrane, a reverse osmosis membrane, or a combination thereof.

20. The method of claim 14, wherein the cleaning composition has a pH of about 3 to 7.

* * * * *